United States Patent [19]

Bayless, Sr. et al.

[11] 4,135,057
[45] Jan. 16, 1979

[54] HIGH DENSITY DIGITAL TRANSMISSION SYSTEM

[75] Inventors: Jon W. Bayless, Sr.; Robert D. Pedersen; John C. Bellamy, II, all of Dallas, Tex.

[73] Assignee: Arthur A. Collins, Inc., Dallas, Tex.

[21] Appl. No.: 857,753

[22] Filed: Dec. 5, 1977

Related U.S. Application Data

[63] Continuation-in-part of Ser. No. 721,329, Sep. 7, 1976, abandoned.

[51] Int. Cl.² .............................................. H04B 1/62
[52] U.S. Cl. ......................................... 178/67; 325/30; 325/321; 325/323
[58] Field of Search .................... 178/67, 68, 88, 66 R; 325/30, 38 A, 41, 42, 65, 320, 321, 323–324

[56] References Cited

U.S. PATENT DOCUMENTS

| | | | |
|---|---|---|---|
| 3,679,977 | 7/1972 | Howson | 325/38 A |
| 3,806,807 | 4/1974 | Nakamura | 178/68 |
| 3,829,779 | 8/1974 | Fujimoto | 178/68 |
| 3,845,412 | 10/1974 | Rearwin | 178/67 |
| 3,887,768 | 6/1975 | Forney | 178/67 |
| 3,947,767 | 3/1976 | Koike | 178/68 |

OTHER PUBLICATIONS

Spaulding, D., "Synthesis of Pulse-Shaping Networks in the Time Domain",Bell System Tech. Journal, vol. 48, Sep. 1969, pp. 2425-2444.
Kabal, P. et al., "Partial-Response Signaling", IEEE Transactions on Communication Technology, vol. COM-23 #9, Sep. 1975, pp. 921-934.

*Primary Examiner*—Benedict V. Safourek
*Assistant Examiner*—Michael A. Masinick
*Attorney, Agent, or Firm*—Richards, Harris & Medlock

[57] ABSTRACT

A high density bandlimited digital transmission system with a transmitter and a receiver connected by a radio path with an end-to-end channel transfer function selected to form at the receiver either raised cosine pulses or partial response pulses. The transmitter is partitioned or divided into an active pulse forming network and a passive pulse shaping and bandlimiting network. The active and passive networks are concatenated and in combination provide an optimal transmitter-receiver combination for raised cosine or for partial response signaling. Transmit and receive filters provide optimal signal pulse shaping while meeting specified out-of-band signal suppression.

In-phase and quadrature phase carriers (I and Q channels) work with rectangular or half-wave sinusoidal modulating pulses. Further, time-offset or time-coincident pulses on each of the respective I and Q channels are used. Multi-level embodiments are also disclosed. Receivers using time-offset modulation forms allowing coherent detection using VSB and SSB techniques with resulting simplification of the receiver structures. This mode of operation is possible without the use of sideband separation filters at the transmitter. Only the receiver structure is affected. Preferred embodiments are described that closely approach optimal performance and achieve information densities in the range from 1.75 to 4 bits per second per Hertz.

53 Claims, 33 Drawing Figures

HIGH DENSITY DIGITAL TRANSMISSION SYSTEM

This application is a continuation in part of application Ser. No. 721,329 filed Sept. 7, 1976, now abandoned.

This invention relates in general to digital signal transmission and, in particular to a high density digital transmission system for communication over bandlimited channels.

The development of high-speed digital carrier transmission systems for application on both terrestrial and satellite radio links is an area of active research interest. Increasing demands for communication services have placed a heavy burden on the available RF bands making it important that digital data transmission systems be efficient in use of the available spectrum. System bandlimiting must be employed in transmitters to suppress out-of-band emissions and in receivers to suppress noise and adjacent channel interference. Bandlimiting results in a transient time response that tends to lengthen the time duration of the received symbols causing an overlap which may cause intersymbol interference. A primary concern in digital transmission systems is that individual symbols be received with minimal or, alternately, predictable intersymbol interference that can be accounted for in the decision process. Zero intersymbol interference can be achieved over a bandlimited channel by using raised cosine pulses. Partial response pulses allow narrower bandwidths for equivalent data rates through the use of controlled and predictable intersymbol interference. Either of these pulse shapes can be employed in the high density digital transmission herein disclosed.

In accordance with this invention, for a selected output pulse shape, receiver filters are provided to shape the receiver input pulse into the desired output pulse shape. This is accomplished while simultaneously achieving necessary suppression of adjacent channel signals and noise. A transmitter filter is provided in combination with the receiver filter to form the necessary channel pulse while also suppressing transmitter out-of-band emissions. The transmitter filter forms a channel pulse by operating on specified input pulse shapes.

Achieving the above described ends involves division of the overall channel function as between the transmitter and the receiver and requires transmitter and receiver filters of particular character. The high density digital transmission system disclosed herein is based on optimal functional division or partitioning to achieve high information density using either raised cosine or partial response pulses. A class of filters is described for use as transmitter and receiver filters which are completely specified by the network pole locations. This allows time domain optimization of the filter pulse response while simultaneously providing specified suppression of adjacent channel interference. Furthermore, the filter structures allow automated design of all channel filters and subsequent performance evaluation using a high speed digital computer. Results of design evaluations enable comparisons to theoretical performance bounds and are also useful in design, manufacturing, testing and field operation of system elements.

Various embodiments of the high density digitial transmission system useful in a wide range of applications are possible. High frequency, high data rate systems often require the use of non-linear power amplifiers in the transmitter for efficient operation. Such amplifiers must be driven with substantially constant amplitude signals, restricting the class of modulating pulses that may be used. Also, they are usually followed by passive output network filters limiting out-of-band emissions. The present high density digital transmission system provides for such operation with the passive output network providing both pulse shaping and necessary transmitter bandlimiting. Various embodiments of the invention allow operation with different modulating pulse forms and with different output pulse forms. Systems with low-level pulse shaping and linear amplification are also provided.

The invention provides, in a high density digital signal transmission system, and end-to-end transmission system having a transmitter and a receiver wherein input data is supplied to the transmitter and wherein data precoding, active pulse shaping, passive pulse shaping, and signal amplification are implemented with timing and frequency reference signals supplied from a stable frequency source. The receiver includes a receiver input section, a receiver pulse shaping network, and a signal detection and decoding section operating together with a timing and frequency recovery system.

In accordance with the invention, a band limited high density digital transmission system operating in combination with input and output signal processing means is provided with a transmitter adapted to be connected to the input processing means and a receiver adapted to be connected to the output processing means. The transmitter includes a modulator having an active pulse forming network and a bandlimiting passive pulse shaping network. The receiver includes a detector having a bandlimiting passive pulse shaping network. The signal channel comprising the transmitter and receiver has a channel function $H_c(j\omega)$ which is the Fourier transform of the desired output pulse in accordance with the relation $H_c(j\omega) = H_{TX}(j\omega)H_{RX}(j\omega)$. The bandlimiting passive pulse shaping network of the receiver has the function $H_{RX}$ which is the complex conjugate of the function $H_{TX}$, where $$H_{TX}(j\omega) = |H_c(j\omega)|^{\frac{1}{2}} e^{j\theta(\omega)} \text{ and } H_{RX}(j\omega) = |H_c(j\omega)|^{\frac{1}{2}} e^{-j\theta(\omega)}$$

wherein $H_{TX}(j\omega)$ is the product of the transmitter active pulse forming nework pulse function, $P(j\omega)$, and the transfer function of the passive pulse shaping network, $H_T(j\omega)$, as $H_{TX}(j\omega) = P(j\omega)H_T(j\omega)$. Predetermined input-to-output pulse shape transformation is achieved while minimizing adjacent channel interference.

A specific embodiment representing the best known mode of carrying out the invention is illustrated in the accompanying drawings.

FIG. 1

Figure 1:
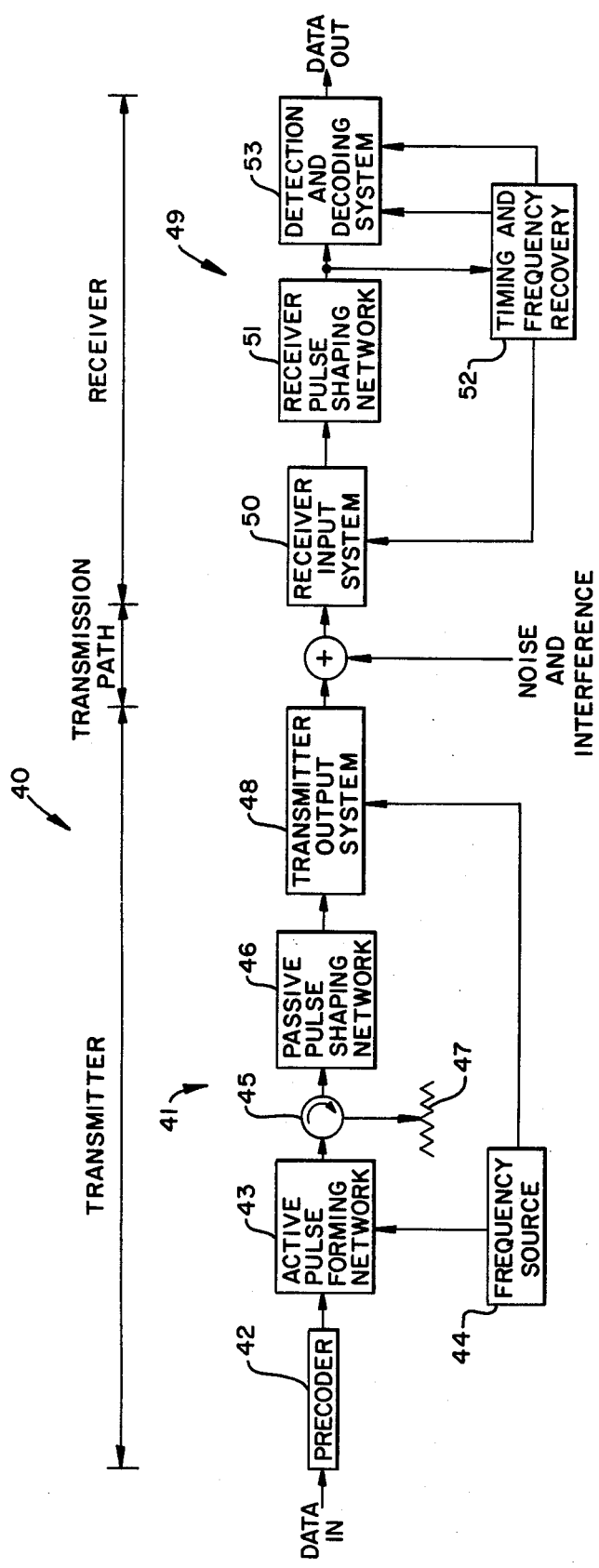
FIG. 1 represents an end-to-end block schematic diagram of a high density digital transmission system.

FIG. 1 illustrates an end-to-end high density digital transmission system 40 embodying the basic structure of the present invention with respect to which several preferred embodiments will be described. In transmitter 41 a stream of input bits arrives at a rate of n/T bits per second and is passed through a precoder 42 that provides differential encoding of the data stream to support carrier recovery and detection operations at the receiver. The precoded data is passed to an active pulse forming network 43 that generates a convenient pulse shape and provides frequency translation and power amplification. The reference for the frequency translation operation is provided by a frequency source 44 that also supplies carrier frequency and clock pulses to the active pulse forming network. Pulses from the active pulse forming network 43 are passed through a directional isolator 45 to a passive pulse shaping network 46 which provides additional pulse shaping and bandlimits the signal frequency power spectrum. Power reflected in the passive pulse shaping network 46 is absorbed in a resistive termination 47 of isolator 45. The reflected power is the fractional portion of the power out of the active pulse forming network 43 filtered out by the passive pulse shaping network 46 due to the combined pulse shaping and bandlimiting operations. The resulting shaped transmission pulse is passed to the transmitter output system 48 wherein additional frequency translation and amplification may be provided.

The transmitter output signal follows the transmission path to a receiver 49. The receiver input system 50 provides amplification and frequency translation. Received transmission data pulses are passed to a receiver pulse shaping network 51 which provides additional pulse shaping and bandlimits noise and interference. The received data in the form of pulse sequences is passed to a timing and frequency source 52 for reference recovery and to a detection and decoding system 53 where the pulse sequence is sampled and data decisions are made.

Optimum Partitioning of the Channel

Figure 2:
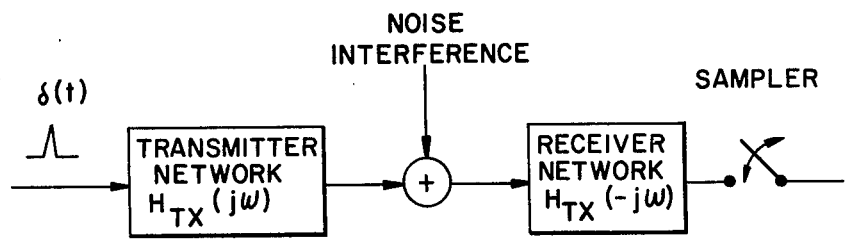
FIG. 2 illustrates the principle of optimal partitioning of a bandlimited channel.

Optimal partitioning of a bandlimited channel is illustrated in FIG. 2. The transmitter network 41' serves both to bandlimit the transmission spectrum and to shape the transmission pulse. As is well known from matched filter theory for receiver network 49', FIG. 2, the optimum receiver function is the complex conjugate of the transmitter function. Equivalently, letting $H_c(j\omega)$ be the real function representing the composite channel, $$H_c(j\omega) = H_{TX}(j\omega) H_{RX}(j\omega). \tag{1}$$

The optimal partitioning of $H_c(j\omega)$ as illustrated in FIG. 2 is $$H_{TX}(j\omega) = |H_c(j\omega)|^{\frac{1}{2}} e^{j\theta(\omega)} \tag{2a}$$

$$H_{RX}(j\omega) = |H_c(j\omega)|^{\frac{1}{2}} e^{-j\theta(\omega)}. \tag{2b}$$

The two functions can have arbitrary phase characteristics so long as one is the complex conjugate of the other. In particular, if $\theta(\omega)=0$ then $H_{TX}(j\omega)$ and $H_{RX}(j\omega)$ are both real functions and are identical. For convenience of presentation, it will be assumed $\theta(\omega)=0$. In practice the actual phase characteristics of real networks is included in the design process. Phase equalizer networks are generally designed for use in conjunction with specific filter networks. When reference is made herein to frequency transfer functions, unless explicitly stated otherwise, these functions are understood to include the combination of filter and equalizer functions.

It is not desirable to excite transmitter network 41' with high intensity, short duration pulses which approximate the impulse function in FIG. 2. Therefore, the transmitter network is divided into the active pulse forming network and passive pulse shaping network illustrated in FIG. 1 and described later.

The partitioning expressed in Equation 2 is optimum in the presence of white Gaussian noise with respect to minimizing the probability of decision error. It is also optimum with respect to minimizing the effect of adjacent channel interference and is near optimum with respect to the probability of decision error in the presence of impulse noise.

Controlling Intersymbol Interference

The optimum channel partitioning illustrated in FIG. 2 for an isolated transmission impulse applies to any bandlimited transmitter filter. In practical digital transmission systems periodic data transmission occurs and intersymbol interference constraints are therefore imposed on the filter function. Bandlimiting in the channel results in a time dispersion of data pulses at the output of the receiver filter. These pulses overlap at the sample instants tending to create intersymbol interference which when uncontrolled impairs the data decision. Control of intersymbol interference provides, by proper selection of the bandlimited channel function of Equation 1, control of pulse overlap to result in either zero intersymbol interference or a predictable amount of intersymbol interference that can be effectively eliminated in the decision process.

Bandlimited Channel

Two types of bandlimited channels are of interest in this invention, the raised cosine channel and the partial response channel. Channel properties are dictated by which of the two receiver output pulse types, the raised cosine pulse or the partial response pulse is selected. It is necessary to understand the two output forms and the various receiver output signals that can be produced to provide a basis for complete description of receiver and transmitter structures which comprise the bandlimited channel of the present invention.

Note that the following description proceeds in a sequence in reverse of the order of signal transmission, that is, the signal formats and system elements are described starting with those near the output of the transmission chain. Others are described in turn proceeding upstream toward the input. This approach serves to clearly develop essential relationships.

Raised Cosine Pulse

Figure 3:
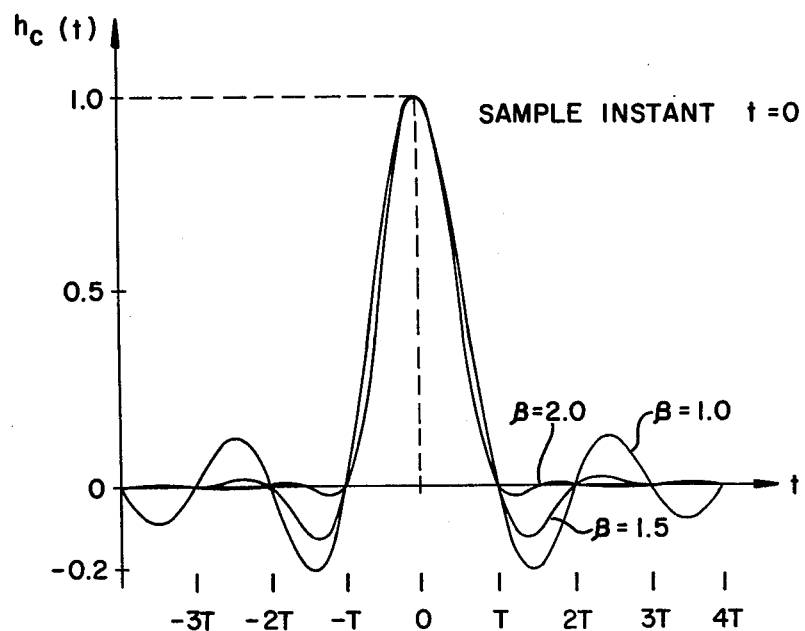
FIG. 3 illustrates a raised cosine pulse as a function of time.
Figure 4:
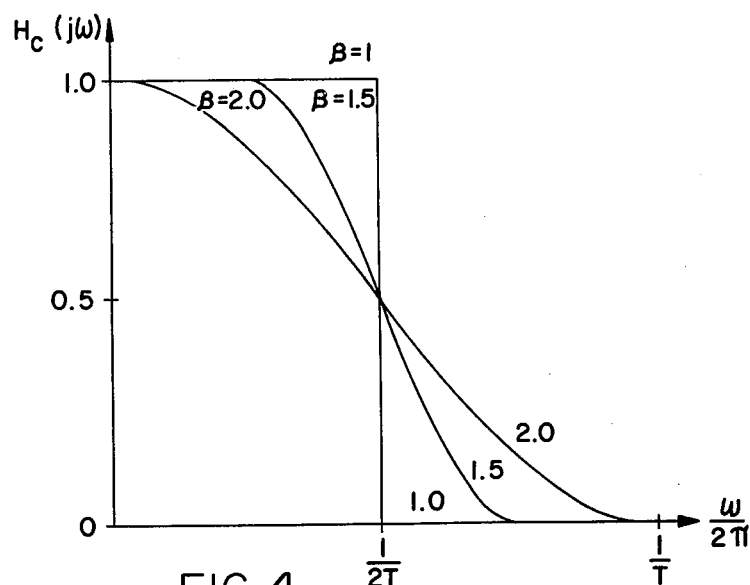
FIG. 4 illustrates a raised cosine channel function.

The receiver output pulse for the raised cosine channel is given by $$h_c(t) = \frac{\sin \pi t/T}{\pi t/T} \frac{\cos(\beta-1)\pi t/T}{1 - 4(\beta-1)^2(t/T)^2}, \quad 1 \leq \beta \leq 2 \quad (3)$$

where the parameter $\beta$ equals the ratio of the cutoff frequency of the composite channel to the Nyquist frequency $\frac{1}{2}T$. The raised cosine pulse function is illustrated in FIG. 3 for several values of $\beta$. For all values of $\beta$, the function has the value of one at the sample instant $t=0$ and is zero at the sample instants $t=\pm nT$, $n=1,2,\ldots$. Thus with the raised cosine pulse function, signalling can occur at a rate $1/T$ with zero intersymbol interference. The raised cosine channel function corresponding to the pulse given by Equation 3 is illustrated in FIG. 4.

Partial Response Pulse

The receiver output pulse for the partial response channel is given by $$h_c(t) = \frac{4 \cos(\pi t/T)}{\pi(1 - 4(t/T)^2)}. \quad (4)$$

Figure 5:
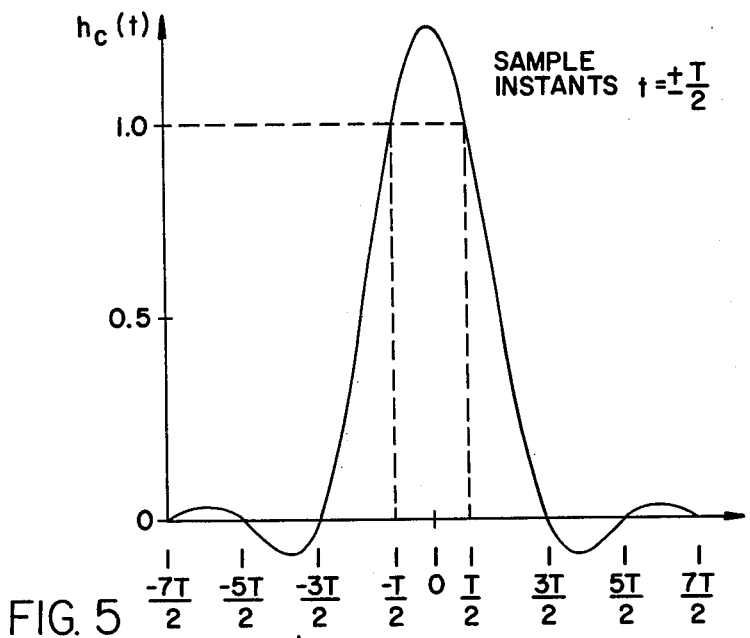
FIG. 5 illustrates a partial response pulse as a function of time.
Figure 6:
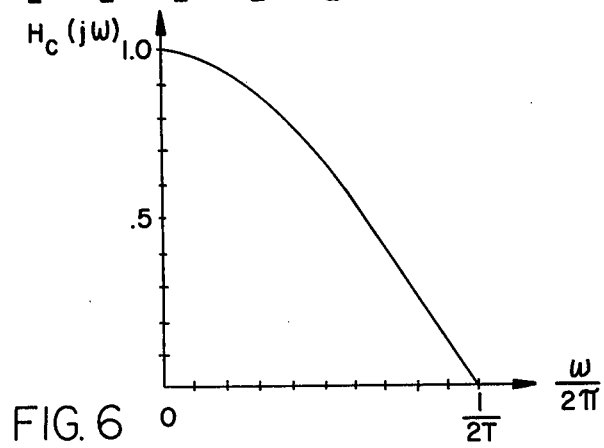
FIG. 6 illustrates a partial response channel function.

This pulse is illustrated in FIG. 5. The function is zero at the sample instants $t = \pm nT/2$, $n=3,5\ldots$ and is one at the sample instants $t = \pm T/2$. Thus when signalling occurs at a rate of $1/T$, the output of the partial response channel is the algebraic sum of two adjacent data symbols. This controlled intersymbol interference can be effectively eliminated by the receiver decision logic. The partial response channel function corresponding to the pulse given by Equation 4 is illustrated in FIG. 6.

Quadrature Channel Representation

It is widely known that a modulated carrier signal can be represented as the sum of two double sideband-suppressed carrier (DSB-SC) amplitude modulated components as follows:

$$S(t) = I(t) \cos\omega_c t + Q(t) \sin\omega_c t. \quad (5)$$

I(t) and Q(t) are respectively the in-phase and quadrature phase modulating pulse sequences as observed at the receiver output. The carrier frequency is denoted as $\omega_c$ (radians/sec.). In this representation, I(t) and Q(t) are sequences of pulses whose amplitudes are data dependent. For example, $$I(t) = \sum_n a_n h_c(t - nT) \quad (6a)$$

$$Q(t) = \sum_n b_n h_c(t - nT) \quad (6b)$$

where $a_n$ and $b_n$ are amplitude constants which depend on the data values for the time interval $nT \leq t \leq (n+1)T$. The pulse function $h_c(t)$ can be either a raised cosine or a partial response pulse depending on the channel type.

Receiver Output Signal Structure

Figure 7:
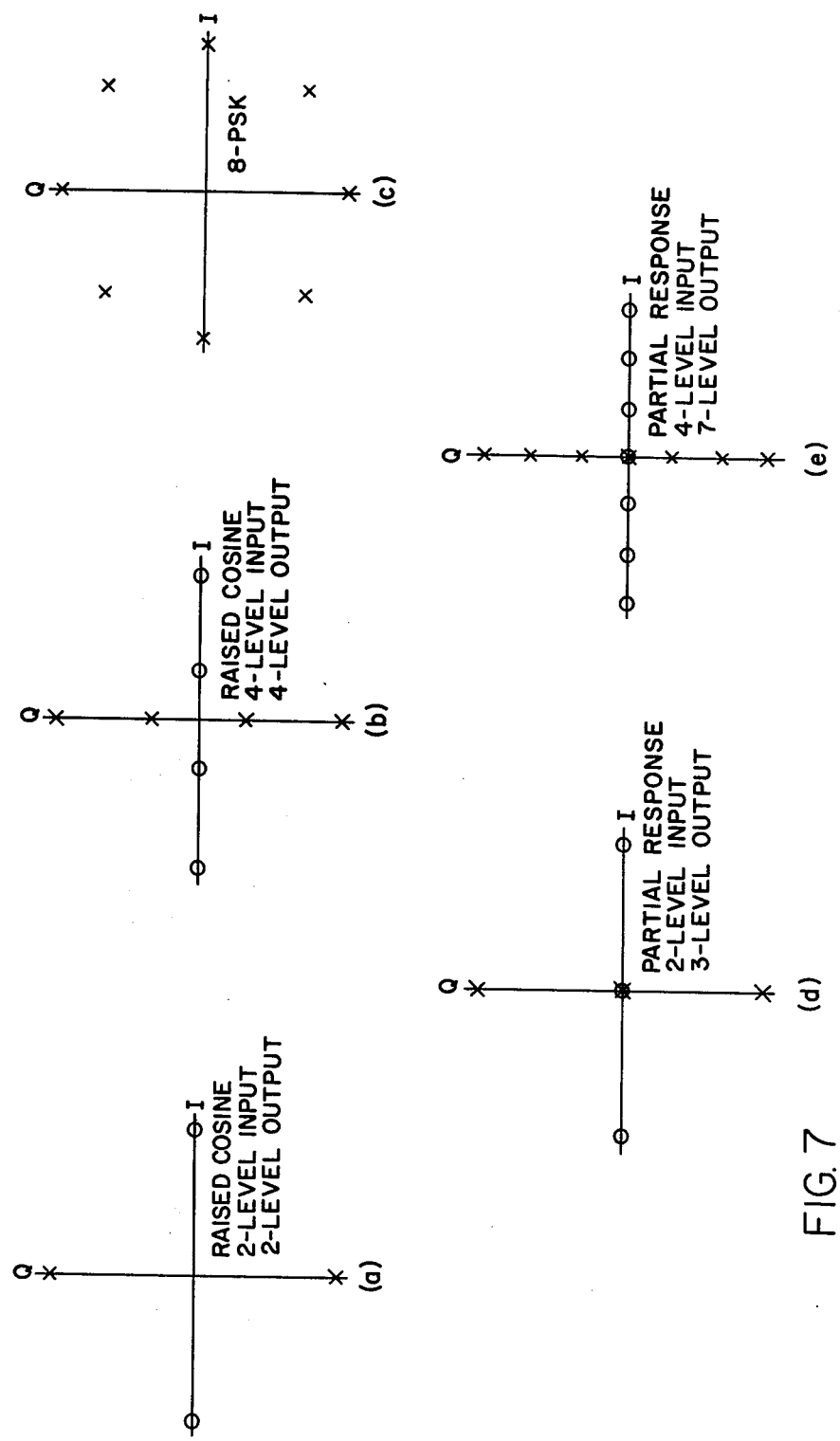
FIGS. 7a through 7e are diagrams of practical signal structures at the receiver output.

The raised cosine and partial response pulses described can be employed to determine a number of practical signal waveforms at the receiver output as indicated in FIGS. 7a through 7e. The projections of the signal points on the I and Q axes represent the value of the quadrature carrier modulating sequences at appropriate sample instants. The legends in FIGS. 7a-7e describe these signals in term of the received signal values. The received signal description has been employed to show the effect on the received signal. Signals indicated by FIGS. 7a, 7b, and 7c are for raised cosine channels. Signals indicated by FIGS. 7d and 7e are for partial response channels. The signals indicated can either be time coincident or time offset. In time coincident signals, the I and Q axis values are defined once each T seconds at the same time instant. In time offset signals, the I and Q axis signal points are defined at alternate instants of time offset by T/2 seconds.

Receiver Structure

Figure 8:
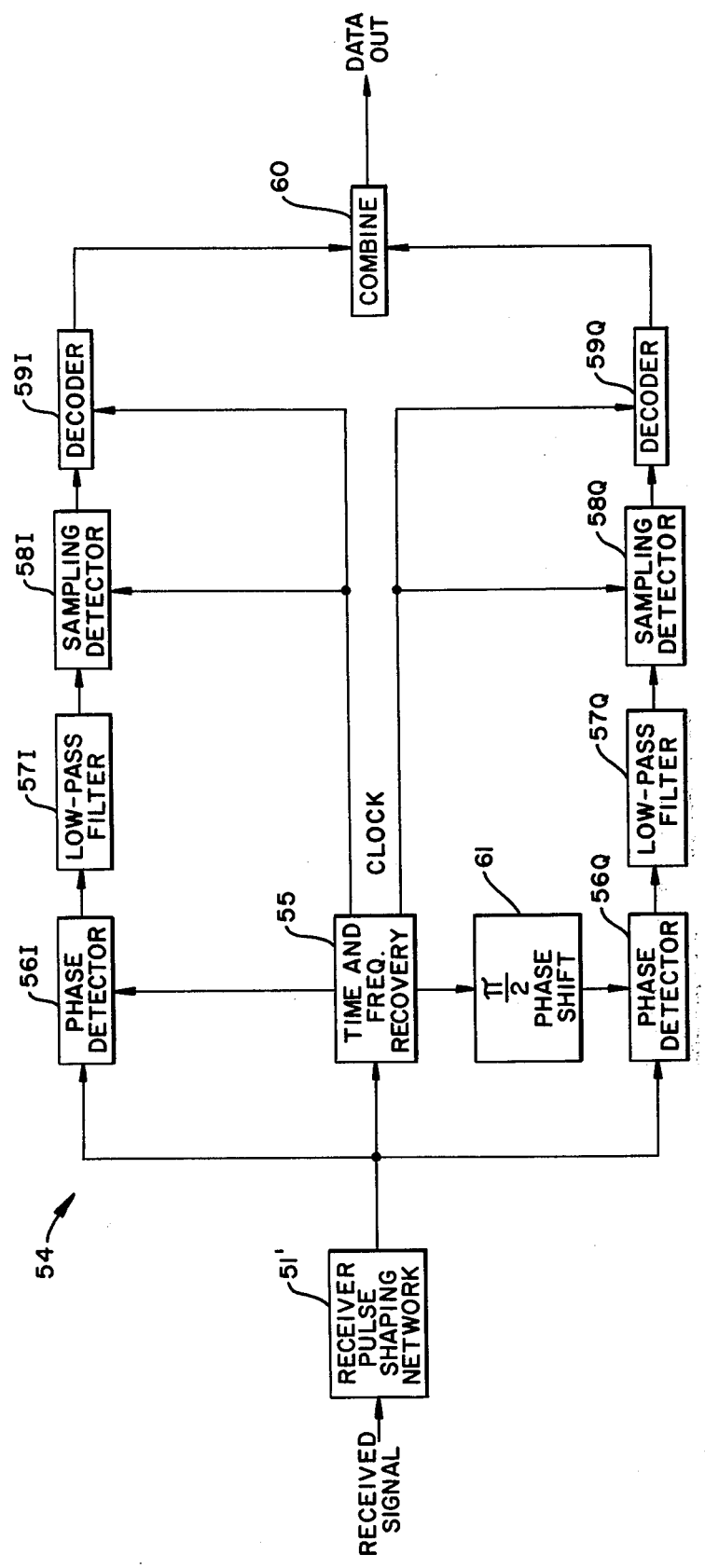
FIG. 8 represents an embodiment of a quadrature channel receiver.

An understanding of the concept of quadrature channels is useful in describing receiver detection and decoding operations. An embodiment of the quadrature channel receiver pulse shaping network, and detection and decoding system 54 is illustrated in FIG. 8. The ouptut of the in-phase I-channel detector 56I and low-pass filter 57I is the in-phase carrier modulation function $$I(t) = \sum_n a_n h_c(t - nT). \quad (6a)$$

The output of the quadrature phase detector and low-pass filter is the quadrature phase carrier modulation function given by $$Q(t) = \sum_n b_n h_c(t - nT) \quad (6b)$$

in the time coincident case and by $$Q(t) = \sum_n b_n h_c(t - nT - \frac{T}{2}) \qquad (6c)$$

in the time offset case.

The sampling detectors 58I and 58Q sample I(t) and Q(t), respectively, at the appropriate sample instants and pass the sample values to the decoder circuits 59I and 59Q and combiner circuit 60 to generate the output data. The details of circuit operation depend on whether the signal structure is time coincident or time offset. With time coincident signalling the sampling detectors 58I and 58Q operate in time alignment. That is to say, two outputs are produced simultaneously every T seconds. With time offset signalling the pulses on each quadrature carrier are offset in time by T/2 seconds. The in-phase detector 58I provides one output at time ... −T,0,T,2T, .... The quadrature detector provides the second output at times ... 3T/2, −T/2, T/2, 3T/2 ....

Figure 9:
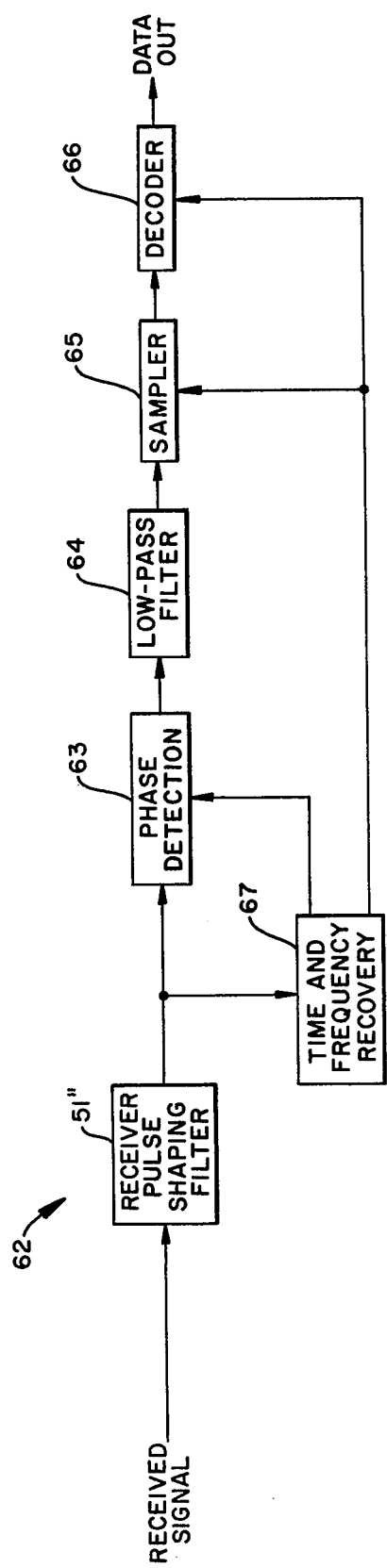
FIG. 9 shows a single channel receiver.
Figure 10:
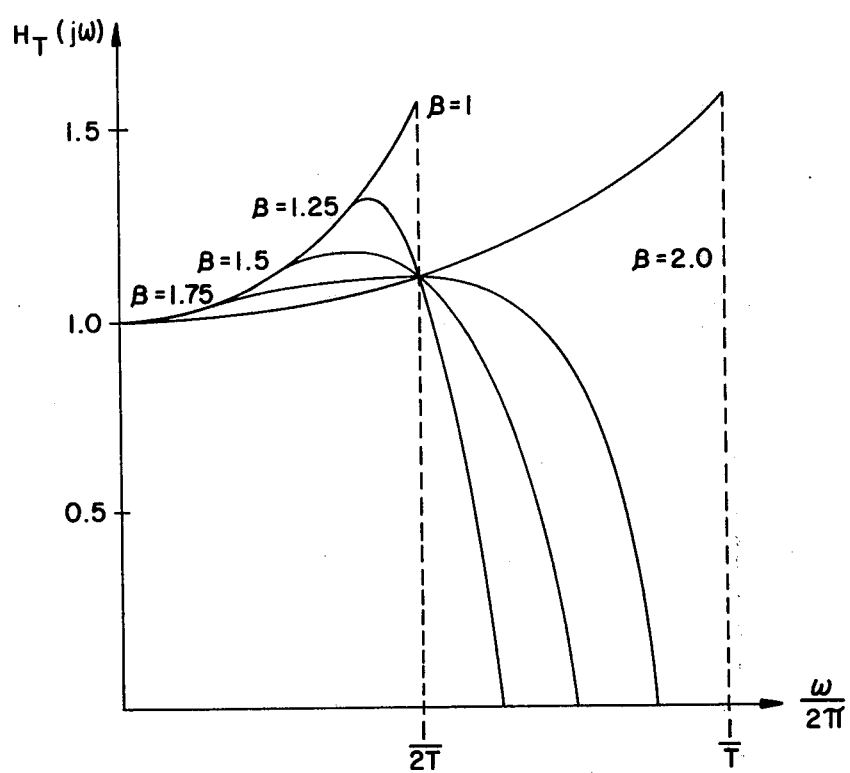
FIG. 10 is a transmitter filter function for a rectangular pulse input to a raised cosine channel.
Figure 11:
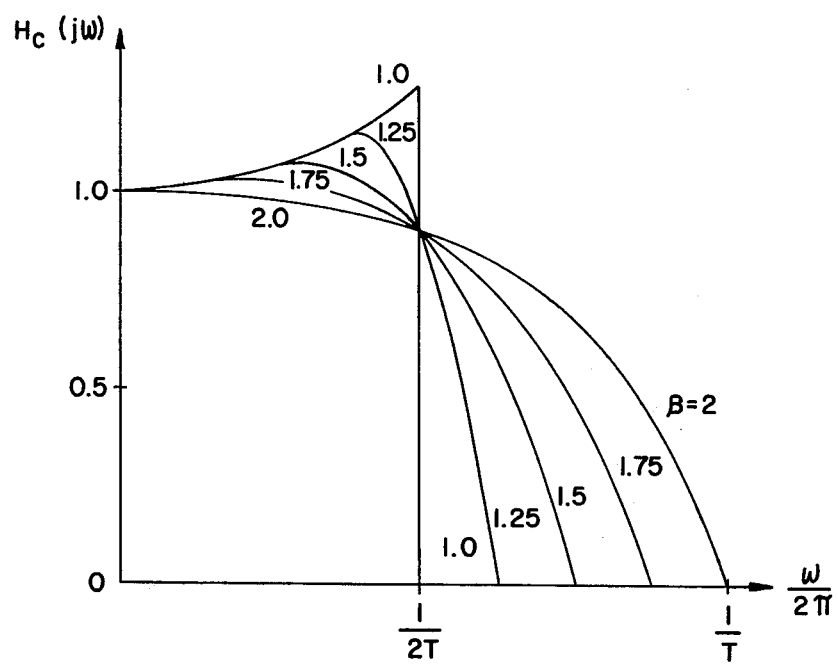
FIG. 11 is a transmitter filter function for a halfwave sinusoidal pulse input to a raised cosine channel.
Figure 12:
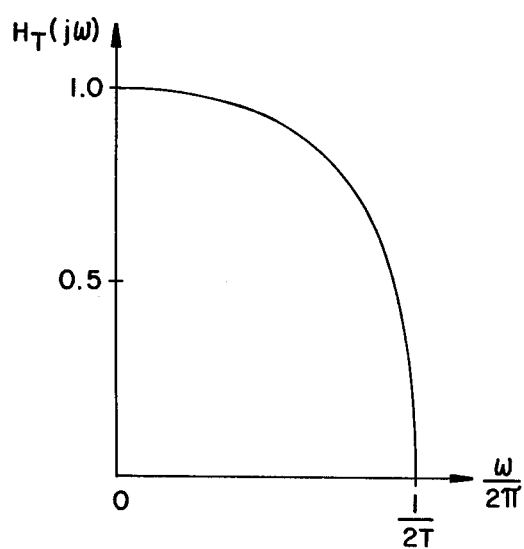
FIG. 12 is a transmitter filter function for a rectangular pulse input to a partial-response channel.
Figure 13:
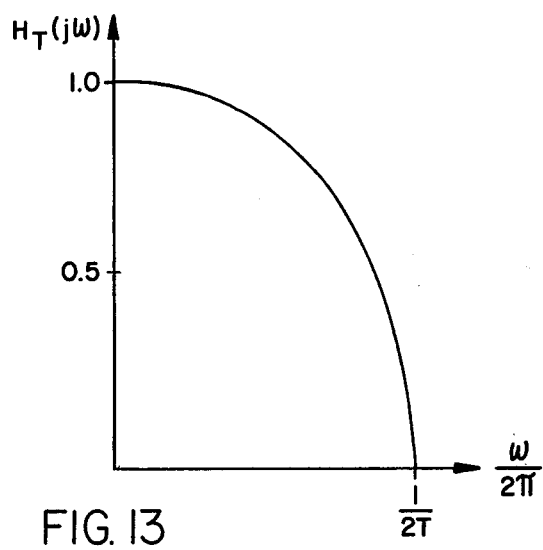
FIG. 13 is a transmitter filter function for a halfwave sinusoidal pulse input to a partial response channel.

With time offset signalling, the signal on the channel is identical (with appropriate precoding of the input data sequence) to vestigial-sideband (VSB) modulation when the raised cosine composite channel function is employed or to singlesideband (SSB) modulation when the partial response composite channel function is employed. Thus a single detector type of receiver can be employed. This receiver embodiment is illustrated in FIG. 9. In this embodiment the output of the receiver pulse shaping network 51" is expressed as $$S_o(t) = I(t) \cos\omega_c t + Q(t) \sin\omega_c t. \qquad (7)$$

All parameters are the same as in Equation 5. The reference carrier is $$r(t) = \cos(\omega_c \pm \pi/T)t \qquad (8)$$

where the ± sign is chosen to conform to either lower or upper sideband operation. Illustrating upper sideband operation, the minus sign is chosen and the output of the phase detector 63 and low-pass filter 64 combination is $$u(t) = I(t) \cos(\pi/T)t + Q(t) \sin(\pi/T)t. \qquad (9)$$

This signal is passed to the sampler 65 where it is sampled at T/2 second intervals producing outputs $$\begin{aligned} u(0) &= I(0) \\ u(T/2) &= Q(T/2) \\ u(T) &= -I(T) \\ u(\frac{3T}{2}) &= -Q(\frac{3T}{2}) \end{aligned} \qquad (10)$$

In general, $$u(k\frac{T}{2}) = (-1)^{k/2} 2(k\,T/2), \quad k \text{ even} \qquad (11)$$

$$= (-1)^{\frac{k-1}{2}} Q(k\,T/2), \quad k \text{ odd}. \qquad (11a)$$

Thus the output of the sampler is alternately equal to the in-phase and quadrature phase modulation components with the indicated sign reversals. These samples are passed to the decoder circuit 66 for decoding into the encoded data values.

The values $a_n$, $b_n$ in Equations 6a, 6b and 6c represent data modulation on the quadrature carriers. The data values are not necessarily binary and can represent multilevel amplitude modulation of the carriers. The two receiver embodiments illustrated in FIGS. 6b and 6c can be employed for detection of multilevel amplitude signalling on quadrature carriers. When multilevel rather than binary signalling is employed, the decoder circuits 59I, 59Q, 66 make multilever rather than binary decisions.

Using optimum channel partitioning, the receiver pulse shaping filter function is the square root of the channel function. A wide variety of channel bandwidths can be accommodated through selection of the appropriate raised cosine or partial response pulse function.

The illustration of channel functions in FIGS. 4 and 6 are based upon low-pass representations of the channel. It is convenient to use low-pass representations for describing system operation. As will be demonstrated, low-pass representations are transformable to equivalent bandpass functions using standard and well known methods.

Standard and well known methods are such as is explained by M. E. Van Valkenburg in "Introduction to Modern Network Synthesis", John Wiley & Sons, Inc., December 1965, in the section beginning at page 479 and is more specifically indicated in Table 16-1 on page 485.

In cases where the bandwidth is large relative to the center frequency, the more exacting procedures taught in the design of arithmetically symmetrical bandpass filters by G. Szentirmai from IEEE Transactions on Circuit Theory, September 1963, page 367 et seq.

Transmitter Passive Pulse Shaping Network

Letting P(jω) denote the Fourier transform of the transmitter pulse function p(t), the composite transmitter network function is given by $$H_{TX}(j\omega) = P(j\omega) H_T(j\omega) \qquad (12)$$

where $H_T(j\omega)$ is the transfer function of the passive pulse shaping network 46. By the principle of optimal channel partitioning $H_{TX}(j\omega)$ is equal to the square root of the composite channel frequency response. Therefore the passive pulse shaping network frequency transfer function is given by $$H_T(j\omega) = \frac{|H_c(j\omega)|^{\frac{1}{2}}}{P(j\omega)}. \qquad (13)$$

The frequency response of the transmitter passive pulse shaping network 46 given by Equation 13 is illustrated in FIGS. 10 through 13 for raised cosine and partial response composite channel functions with square and half-wave sinusoidal excitation pulses. The signal as observed on the transmission path is identical for either type of excitation pulse.

Transmitter Active Pulse Forming Network

It is well known that conventional type modulators can be employed to generate RF carrier pulses of finite amplitude and of finite duration. The term active pulse forming network is employed here to denote the pulse forming function which must be implemented in the transmitter. In some embodiments, the pulse forming function is implemented by a conventional modulator circuit, in other embodiments the pulse forming is implemented at baseband where the term modulator is not normally applied to describe the circuits employed. In either case, the term active pulse forming network is used to denote all associated circuitry required for generation of a desired pulse form and translation of that pulse form to the desired carrier frequency when such a carrier frequency is employed.

Phase-shift keying (PSK) modulators generate time coincident rectangular pulses on each quadrature carrier. The normalized envelop function of each quadrature channel is $$p(t) = \begin{cases} 1 & -\frac{T}{2} \leq t \leq \frac{T}{2} \\ 0 & \text{elsewhere.} \end{cases} \quad (14)$$

Offset PSK modulators generate the same pulse function on each quadrature carrier but the envelopes are offset in time by T/2 seconds. Minimum-shift-keying (MSK) modulators generate time offset half-wave sinusoidal pulses. The envelop function of each quadrature carrier is given by $$p(t) = \begin{cases} \cos(\pi t/T) & -\frac{T}{2} \leq t \leq \frac{T}{2} \\ 0 & \text{elsewhere.} \end{cases} \quad (15)$$

Both PSK and MSK modulators produce constant amplitude composite carrier signals that can be amplified in non-linear amplifiers included as a part of the pulse forming network. This property is particularly useful for very high data rate, high carrier frequency applications when efficient linear amplifiers are not available. When linear amplifiers are employed, multi-level quadrature amplitude modulators can be used to increase the information density capability of the digital transmission system using the same basic envelop functions. Linear frequency translation and linear power amplification can be included as a part of the transmitter output system 48.

The spectra of both PSK and MSK RF pulses as generated in the active network are wideband compared to the composite channel bandwidth. Only a portion of the signal power in the principle lobe of either power spectra is observed on the transmission path. The remaining signal energy is reflected and dissipated in the resistive termination 47, FIG. 1, of the transmitter directional isolator 45. The ratio of power observed on the transmission path to power output from the pulse forming network is defined to be the pulse form efficiency factor $\eta$.

The receiver output signal structures shown in FIGS. 7a through 7e can be related to the RF excitation pulses described above. Signal structures 7a and 7b can be generated in the transmitter active network using conventional QPSK, offset-QPSK, or MSK modulators. Signal structures 7b and 7e result from multi-level input QPSK, offset-QPSK, or MSK modulators driving a partial response channel. Signal structure 7c resultss from a conventional 8-PSK modulator. The points illustrated in FIGS. 7a, 7b, 7d, and 7e correspond to I and Q channel projections at the sample time. The points of FIG. 7c represent the resultant phasor locations at the sample times.

Network Realization and Optimization

It is necessary to provide practical filter networks that closely approximate the idealized passive pulse shaping network functions. The filters outlined herein are used to implement a time domain filter based on shaping input pulses into desired output pulse shapes. This is to be contrasted with conventional analog filter designs which are approached from the frequency domain point of view with no precise control of the network pulse response. Use of conventional approaches for pulse transmission systems invariably involves compromises between frequency response and intersymbol interference in the time-domain caused by band-limiting.

Figure 14:
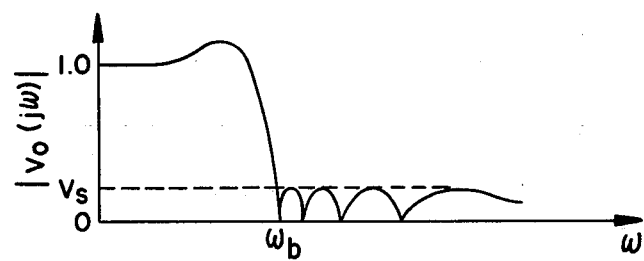
FIG. 14 is an equal-ripple stopband filter curve.

All of the filter functions illustrated in FIGS. 10 through 13 have infinite attenuation in the stopband whereas practical filters do not. An attractive realizable filter is one with an equal-ripple stopband frequency response such as illustrated in FIG. 14. A low-pass prototype frequency response transfer function for an equal-ripple stopband filter is given by $$G(s) = \sum_{i=1}^{N} \frac{R_i}{s - s_i} \quad (16)$$

where $$R_i = KZ_i \prod_{\substack{j=1 \\ j \neq i}}^{N} \frac{z_i + z_j}{s_i - s_j}$$

and $z_i^2 = s_i^2 - \omega_b^2$ where $G(s)$ is the filter transfer function expressed in terms of the Laplace transform complex variable, s. The lower edge of the stopband is $\omega_b$ and K is the maximum gain in the stopband. This transfer function is used to approximate the desired transmitter and receiver pulse shaping filter frequency characteristics. The filter must, in turn, be concatenated with an all-pass equalizer to provide the needed degrees of freedom to permit matching of transmitter and receiver phase characteristics. The equalizer does not change the amplitude response but can be used to improve the overall network phase linearity. An all-pass equalizer is described by the transfer function $$E(s) = K \prod_{i=1}^{\pi} \frac{-s - s_i}{s - s_i} ; R_e s_i \geq 0. \quad (17)$$

The zeros of E(s) are mirror images of the network poles. The passive pulse shaping transmitter filter becomes $H_T(j\omega) = G_T(j\omega)E_T(j\omega)$, and the receiver pulse shaping filter is $H_{RX}(j\omega) = G_R(j\omega)E_R(j\omega)$. The poles of $G_R(j\omega)$ and $G_T(j\omega)$ are selected to yield good approximations to the desired amplitude response as a function of frequency and the respective equalizers are designed to compensate for non-linear phase.

Selecting these particular transfer functions for G(s) and E(s) has the advantage that final adjustment of the filter and equalizer poles is made to yield the desired time domain samples. The composite transfer function of the transmitter and receiver passive pulse shaping networks is $$H(s) = G_T(s)E_T(s)G_R(s)E_R(s). \quad (18)$$

The transform of the output pulse is given by $H_c(s) = H(s)P(s)$. This function is expandable in partial fraction form using well established methods. The resulting time pulse is described by:

$$h_c(t) = \sum_{i=1}^{M} R_i \exp(s_i t) \tag{19}$$

where $R_i$ are complex residues of $H_c(s)$ and M is the total number of system poles. The difference between $h_c(t)$ at the sample times and the desired sample values can be formulated and the optimal pole locations found to minimize the squared error of this difference while also meeting the specified frequency domain amplitude response. We have $\delta = \Sigma\{\hat{h}_c(t_i) - h_c(t_i)\}^2$ where $\hat{h}_c(t)$ is the desired sample value at time $t_i$. Examination of the above relationships will reveal that this squared error is only a function of the system pole locations. Hence, this error may be minimized with respect to the pole locations using non-linear programming methods. The optimization is carried out in the time domain with specified stopband attenuation in the frequency domain.

Figure 15:
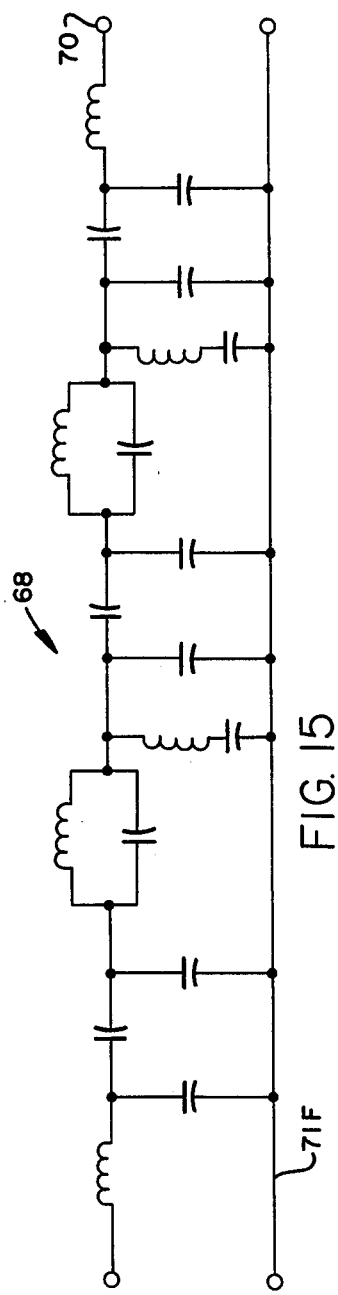
FIG. 15 is a typical equal-ripple stopband, bandpass filter.
Figure 16:
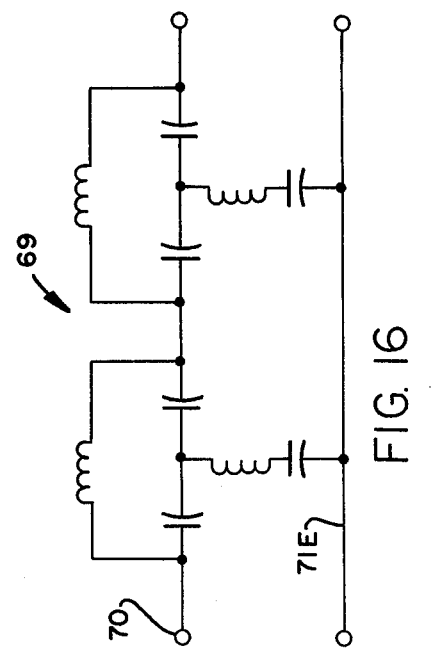
FIG. 16 is a typical all-pass equalizer bandpass filter.

Typical equal-ripple, bandpass filter and all-pass equalizer realizations are illustrated in FIGS. 15 and 16 with the filter and equalizer networks 68 and 69 used in tandem as the passive transmitter pulse shaping network 46 and as the passive receiver pulse shaping network 51 of FIG. 1. The bandpass filter of FIG. 15 is based on a five-pole baseband prototype network with the bandpass equalizer of FIG. 16 based on a two-pole baseband prototype equalizer. These designs are developed by use of the described design procedures with appropriate known low-pass-to-bandpass transormation. The same topology is applicable to both transmitter and receiver filter circuits with appropriate adjustment of element values. It should be noted, however, that for some applications other transmitter and receiver filter realizations are desirable.

The equal-ripple stopband filter described by Equation 16 is completely specified by its pole locations with the network zeroes determined by the pole locations. The same is true of the low-pass equalizer network. This enables (1) expansion of $H(s)P(s)$ in partial fraction form and (2) expression of the time response in terms of the complex residues, $R_i$. The function G(s) also has the property that the stopband frequency, $\omega_b$, and the stopband attenuation may be predetermined.

The above described procedure for time domain optimization may be used for other filters. An example is an all-pole transfer function $$G'(s) = K \prod_{i=1}^{M} \frac{1}{s - s_i}. \tag{20}$$

While this form does not explicitly define the stopband characteristics, it will result in somewhat simpler filter network structures with a stopband frequency response that is a monotonically decreasing function of the frequency variable. As a result, a sufficient number of poles will guarantee acceptable adjacent channel level performance, despite the fact that the cut-off will not be as well defined as for G(s).

Figure 17:
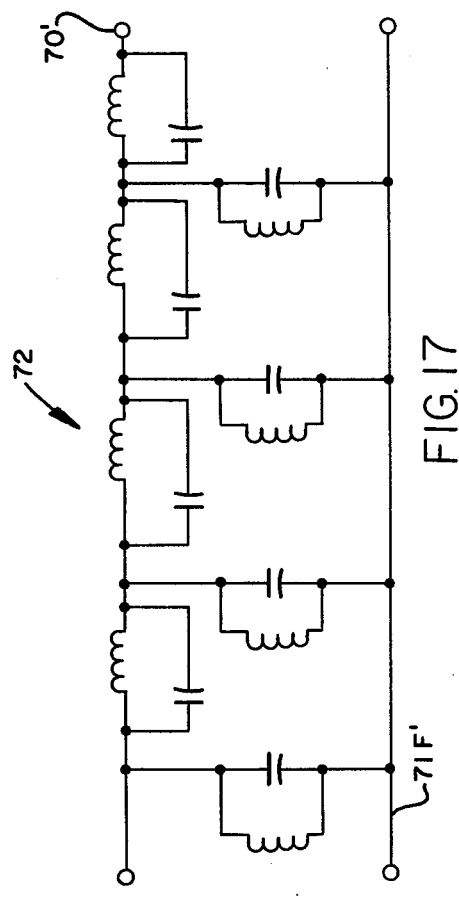
FIG. 17 is a typical bandpass ladder network filter.

The bandpass ladder network filter 72 of FIG. 17 is a typical filter usable as an alternative filter embodiment in place of the filter 68 of FIG. 15, as a transmitter filter 46 and as a receiver filter 51. This kind of simple ladder network realization is made possible with G'(s) as an all-pole function with all its zeroes of transmission at infinity.

While the preceding filter descriptions have been expressed in terms of prototypes using standard inductors and capacitors, other realizations using coaxial lines, strip lines, or waveguides are also usable. Digital filters and active filters are also appropriate for some applications.

Having determined the analytic form of G'(s), the realization of various kinds of filters is readily attainable using standard techniques. Waveguide filters are especially appropriate for RF filters. Waveguide filter cavity electrical lengths and the iris reactance specifications are expressable directly in terms of the same low-pass filter element values applicable to the ladder network filter of FIG. 17.

The pole-zero plots illustrated in FIGS. 18 through 33 are examples of filters optimized as herein described. The filters specified by FIGS. 18 through 25 are equal-ripple stopband transmitter and receiver filters. The filters of FIGS. 26 through 33 are all pole transmitter and receiver filters. In the figures, the X's represent poles and the O's represent zeroes. Equalizer poles and zeroes are subscripted with the letter "e". The plots are for low-pass prototype networks and are normalized to a one symbol per second rate. These examples of transmitter and receiver filter and equalizer poles and zeroes locations yield optimal performance. Low-pass to bandpass transformation may be made using standard techniques to yield the desired bandpass prototypes at the appropriate center frequencies as above described.

Performance Evaluation

Transmission system error performance can be related to the minimum distance between points in the signal structures illustrated in FIGS. 7a through 7e. Table I below gives the required signal-to-noise ratio expressed in terms of the energy-per-bit to noise spectral density ratio, $E_b/N_o$, on the transmission path required to achieve an average probability of bit error $P_e = 10^{-6}$ for the respective signal structures.

Table I

|  | a | b | c | d | e |
|---|---|---|---|---|---|
| $E_b/N_o$ (dB) | 10.7 | 14.7 | 14.0 | 10.7 | 14.7 |
| Signal Processing Gain (dB) | 0 | 0 | 0 | 2.1 | 2.1 |

The signal structures of FIGS. 7d and 7e resulting from the partial response channel function possess redundant output levels that tend to increase the probability of error for a fixed signal-to-noise ratio but also represent a built-in coding redundancy that can be recovered by signal processing to avoid the performance loss that would otherwise occur. The signal processing gains required are included in the signal-to-noise ratio values shown and are listed separately in Table 1.

Two additional performance parameters are the pulse form efficiency, $\eta$, and the information density, $\delta$. The parameter, $\eta$, is numerically equal to the ratio of the signal power output of the passive pulse shaping network to the signal power output of the active pulse forming network. Table II below gives typical values of the parameter $\eta$ for the various active pulse forming networks and passive pulse shaping networks described above.

Table II

| Input Pulse | Rectangular Pulse | | Half-Wave Sinusoidal Pulse | |
|---|---|---|---|---|
| Output Pulse | Raised Cosine | Partial Response | Raised Cosine | Partial Response |
| $\eta$ | 0.59 | 0.64 | 0.62 | 0.52 |

The parameter, η is primarily of importance in systems using non-linear power amplification in the active pulse forming network of FIG. 1 with no additional amplification in the transmitter output system. The pulse forming efficiency is of less importance in systems using only low level amplification in the active pulse forming network and linear power amplification in the transmitter output system. In this case, the important system parameter is the attainable efficiency of the linear output power amplifier. The most appropriate approach will depend on the application requirement.

The parameter δ, expressed in bits per second per Hertz, quantifies how effectively the spectrum of the transmission path is utilized. This is important when the transmission path is a shared resource utilized by several transmitter-receiver pairs operating on adjacent channels. Channel spacing is defined by requiring the received power from transmitters on adjacent channels to be typically 10 dB below the in-band additive noise power level at a bit error rate of $10^{-6}$. Typical values of the parameter δ are shown in Table III.

The values of performance parameters $E_b/N_o$, δ, and η of Tables I, II and III are shown for the theoretical bandpass channel functions illustrated in FIGS. 10 through 13. These channel functions can be closely approximated in practice and therefore the performance parameter values listed are representative of values achieved in practical implementations.

Table III

| | 2-Level Raised Cosine | 3-Level Partial Response | 4-Level Raised Cosine | 7-Level Partial Response | 8-PSK Raised Cosine |
|---|---|---|---|---|---|
| δ, bps/Hz | 1.83 | 2.14 | 3.64 | 4.20 | 2.73 |

The use of transmit and receive filters specifically designed to provide signal bandlimiting and, at the same time, optimal signal pulse shaping as herein described, results in high-density digital transmission achieving information densities considerably higher than achievable with conventional systems. Filter and equalizer functions specified by complex pole locations preferably are optimized using non-linear programming methods to minimize squared error functions of the time domain sample values. Output pulses may be formed with sample values corresponding to raised cosine pulses or partial response pulses. The equal-ripple stopband and all-pole filters together with the all-pass equalizers described herein are examples of possible networks. Systems can be arranged with non-linear or linear transmitter power amplifiers. The use of offset shift keying modulators allows a simple receiver structure with detection being accomplished by a single phase coherent reference at the receiver in an approach analogous (1) to vestigial sideband detection for raised cosine pulses or (2) to single-sideband for partial response pulse. Alternatively, receivers can be equipped with separate I-channel and Q-channel detectors.

With the design of specific filters completed, as represented by the pole and zero diagrams, numerical values for the elements in the filters can be selected once (1) the data rate and (2) the carrier frequency are specified. Once those selections are made, the values of the filter elements are directly determined from the pole-zero diagrams.

By way of example and in order to further illustrate the two solutions once the operating parameters are selected, two examples are given herebelow. Both assume a phase shift keying (PSK) system wherein (1) the data rate is selected to be 16 megabits per second per channel and (2) the carrier frequency is 70 megahertz.

With the foregoing parameters, the pole and zero locations as found in FIGS. 18-21 are utilized to determine the precise values of the lumped constants in the filters of FIGS. 15 and 16. The first example to be given is for PSK operations employing raised cosine output. The second example to be given is for PSK operations using partial response output.

EXAMPLE 1

Figure 18:
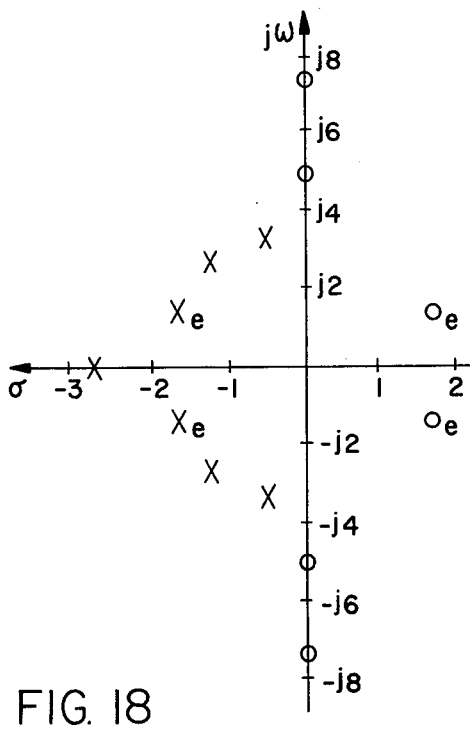
FIGS. 18 and 19 are transmit and receive filter and equalizer pole-zero diagrams for a rectangular pulse input to a raised cosine channel with equal-ripple stopband filters.
Figure 19:
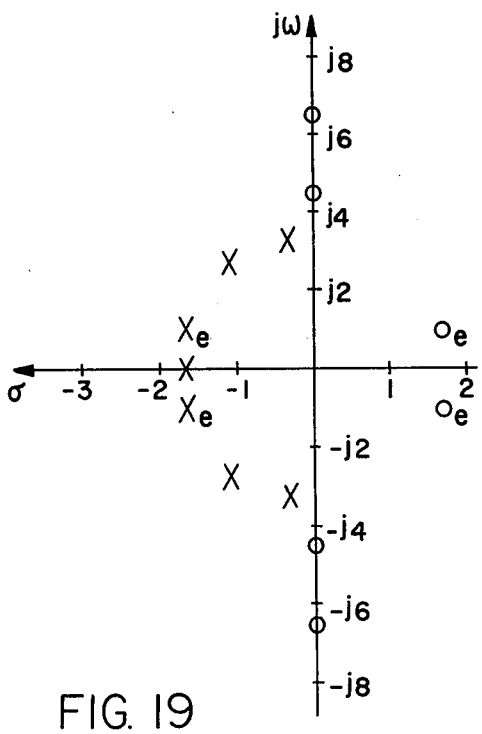

Consider first and pole-zero diagram of FIG. 18 which is "the transmit filter and equalizer pole-zero diagram for a rectangular pulse input to a raised cosine channel with equal-ripple stopband". FIG. 19 is a "receive filter and equalizer pole-zero diagram for a rectangular pulse input to a raised cosine channel with equal-ripple stopband.

As earlier indicated herein, the pole-zero diagrams of FIGS. 18 and 19 are expressed in radian frequency and are normalized to unit signaling frequency.

In Table A, the poles and zeros for the transmit filter and the transmit equalizer are tabulated in column 2. That is, the data tabulated in column 2 for the transmit filter and transmit equalizer are merely data values read from FIG. 18. More particularly, the first set of values ($-0.51 \pm j3.32$) represent the values as plotted in FIG. 18 of the poles denoted by (a). The second set of values of column 2 of Table A are the values of the pole locations (b) of FIG. 18 ($-1.22 \pm j2.68$). In a similar manner, the other values of the poles and zeros for the transmit filter and the transmit equalizer as set forth in column 2 are taken from FIG. 18.

Similarly, the poles and zeros for the receiver filter and the receiver equalizer are taken from the pole-zero diagram of FIG. 19.

Table A

Example Prototype Pole Zero Tranformations
Center Frequency = 70 MHz, Data Rate = 16 Mbps
Rectangular Pulse to Raised Cosine Pulse

| Col. 1 Filter | | Col. 2 Prototype Poles & Zeros σ ± jω | Col. 3 Band pass Poles and Zeros (÷10⁶) for Arithmetic Symmetry |
|---|---|---|---|
| Tx. Filter | Poles | $-0.51 \pm j3.32$<br>$-1.22 \pm j2.68$<br>$-2.72$ | $-7.90 \pm j493$<br>$-7.90 \pm j387$<br>$-19.3 \pm j483$<br>$-19.3 \pm j397$<br>$-44.4 \pm j440$<br>$-417 \pm j398$ |
| | Zeros | $0 \pm j4.90$<br>$0 \pm j7.35$ | $0 \pm j517$<br>$0 \pm j363$<br>$0 \pm j552$<br>$0 \pm j327$<br>$0 \pm j0$ |
| Tx. Equalizer | Poles | $-1.65 \pm j1.39$ | $-26.4 \pm j462$<br>$-26.4 \pm j418$ |
| | Zero | $-1.65 \pm j1.39$ | $26.4 \pm j462$<br>$26.4 \pm j418$ |
| Rx. Filter | Poles | $-0.35 \pm j3.27$<br>$-1.09 \pm j2.66$<br>$-1.69$ | $-5.53 \pm j492$<br>$-5.53 \pm j387$<br>$-17.2 \pm j483$<br>$-17.2 \pm j397$<br>$-27.4 \pm j440$ |
| | Zeros | $0 \pm j4.49$<br>$0 \pm j6.55$ | $0 \pm j511$<br>$0 \pm j369$<br>$0 \pm j541$<br>$0 \pm j339$<br>$0 \pm j0$ |
| Rx. Equalizer | Poles | $-1.66 \pm j1.01$ | $-26.6 \pm j456$<br>$-26.6 \pm j424$ |
| | | $1.66 \pm j1.02$ | $26.6 \pm j456$ |

Table A-continued
Example Prototype Pole Zero Tranformations
Center Frequency = 70 MHz, Data Rate = 16 Mbps
Rectangular Pulse to Raised Cosine Pulse

| Col. 1 Filter | Col. 2 Prototype Poles & Zeros $\sigma \pm j\omega$ | Col. 3 Band pass Poles and Zeros ($\div 10^6$) for Arithmetic Symmetry |
|---|---|---|
| Zero | | $26.6 \pm j424$ |

With the values of the poles and zeros thus tabulated, the next step is to transform the low-pass prototype pole-zero values to bandpass values corresponding to the desired data rate and center frequency as taught by Van Valkenburg or Szentirmai. The results of such a transformation for 16 megabit per second channel rates and a 70 megahertz center frequency are given in column 3 of Table A.

From the values of the bandpass poles and zeros as arrayed in column 3 of Table A, the actual values of the resistors, inductances and capacitors that comprise the networks of FIGS. 15 and 16 are then to be determined.

The actual lumped constant values utilized for the PSK operations utilizing raised cosine outputs are thus tabulated in Table B.

Table B
Psk Bandpass Filter and Equalizer
Element Values for Raised Cosine Output
Pulses; 16 Mbps channels, 70 MHz Carrier.
($R_{in} = R_{out} = 1$ ohm, c in picofarads, L in nanohenries)

| Element | Tx. Filter | Rx. Filter | Element | Tx. Equalizer | Rx. Equalizer |
|---|---|---|---|---|---|
| L1 | 29.2 | 23.2 | L7 | .493 | .507 |
| C1 | 109.5 | 134 | C14 | 18900 | 18800 |
| C2 | 72.2 | 95.3 | C15 | 500 | 517 |
| C3 | 263 | 338 | L8 | 9.45 | 9.40 |
| L2 | 5.85 | 4.09 | C16 | 500 | 517 |
| C4 | 560 | 833 | L9 | .6 | .587 |
| L3 | 8.24 | 11.0 | C17 | 18900 | 18800 |
| C5 | 923 | 668 | C18 | 614 | 600 |
| C6 | 1583 | 1283 | L10 | 9.45 | 9.40 |
| C7 | 1463 | 1208 | C19 | 614 | 600 |
| C8 | 840 | 818 | | | |
| L4 | .349 | .424 | | | |
| C9 | 10700 | 9000 | | | |
| L5 | 4.80 | 4.63 | | | |
| C10 | 1943 | 1890 | | | |
| C11 | 1193 | 1673 | | | |
| C12 | 8700 | 5430 | | | |
| C13 | 237 | 428 | | | |
| L6 | .997 | 1.05 | | | |

Figure 20:
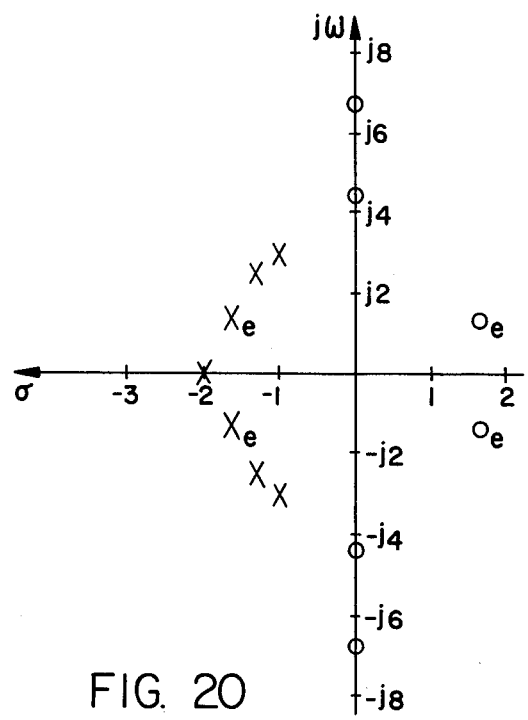
FIGS. 20 and 21 are transmitter and receiver filter and equalizer pole-zero diagrams for a rectangular pulse input to a partial response channel with equal-ripple stopband filters.
Figure 21:
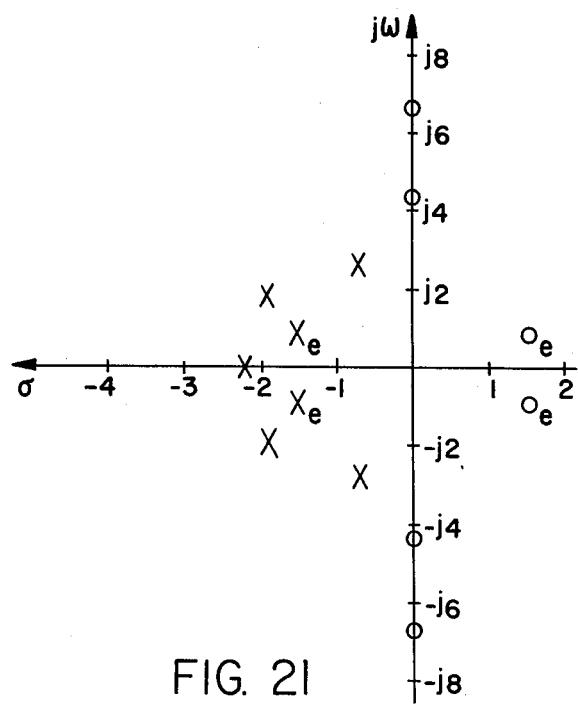
Figure 22:
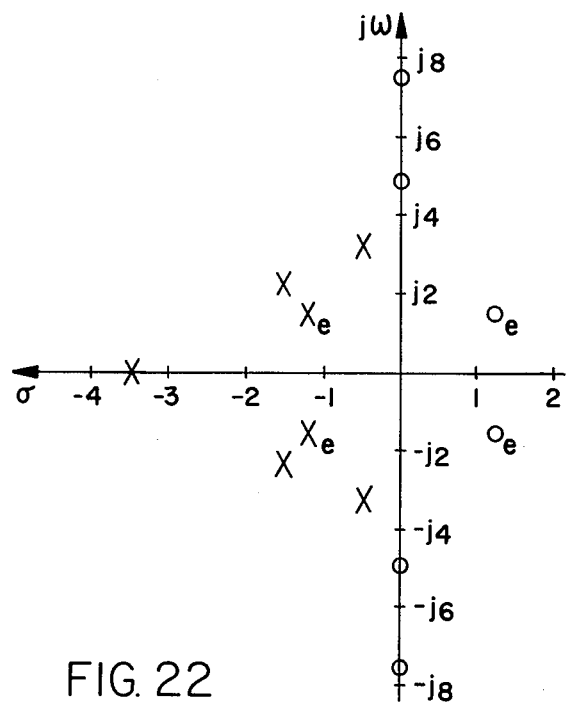
FIGS. 22 and 23 are transmitter and receiver filter and equalizer pole-zero diagrams for a half-wave sinusoidal pulse input to a raised cosine channel with equal-ripple stopband and filters.
Figure 23:
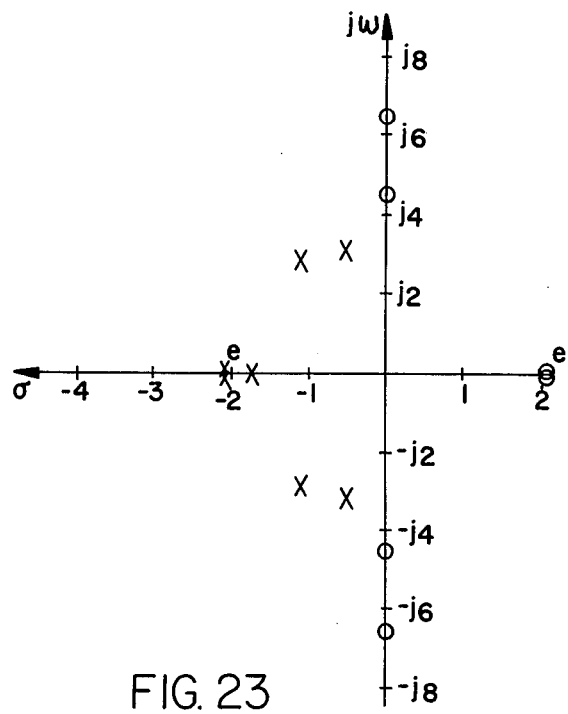
Figure 24:
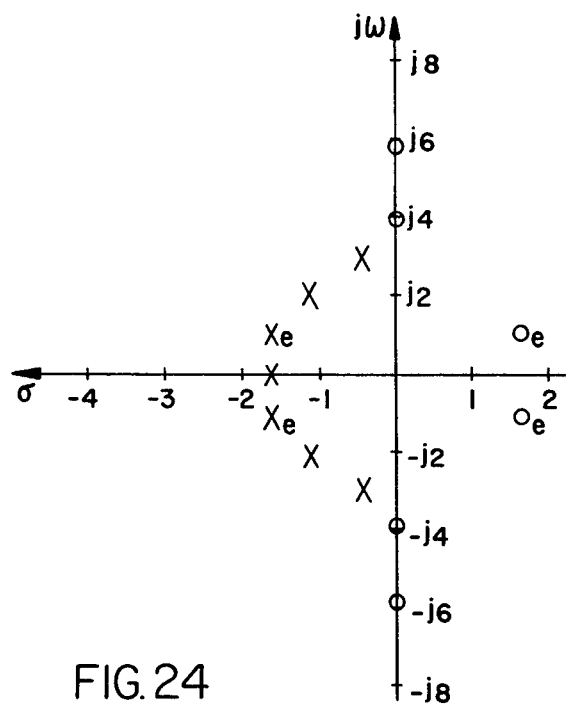
FIGS. 24 and 25 are transmitter and receiver filter and equalizer pole-zero diagrams for a half-wave sinusoidal pulse input to a partial response channel with equal-ripple stopband filters.
Figure 25:
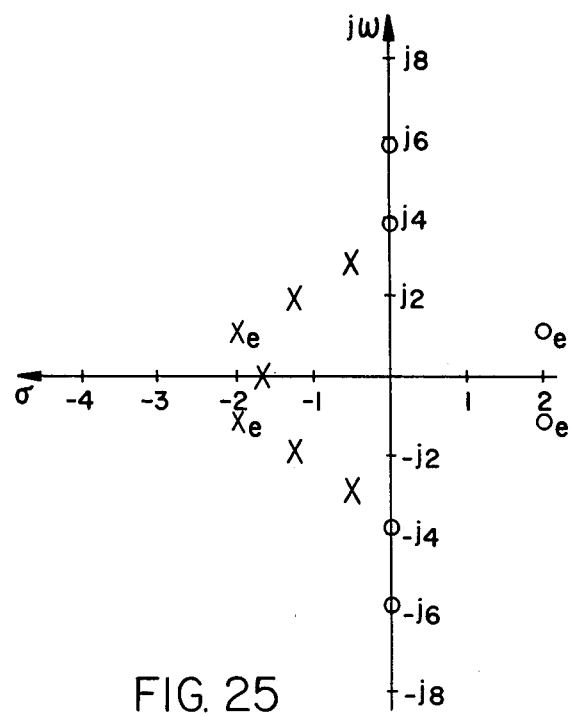
Figure 26:
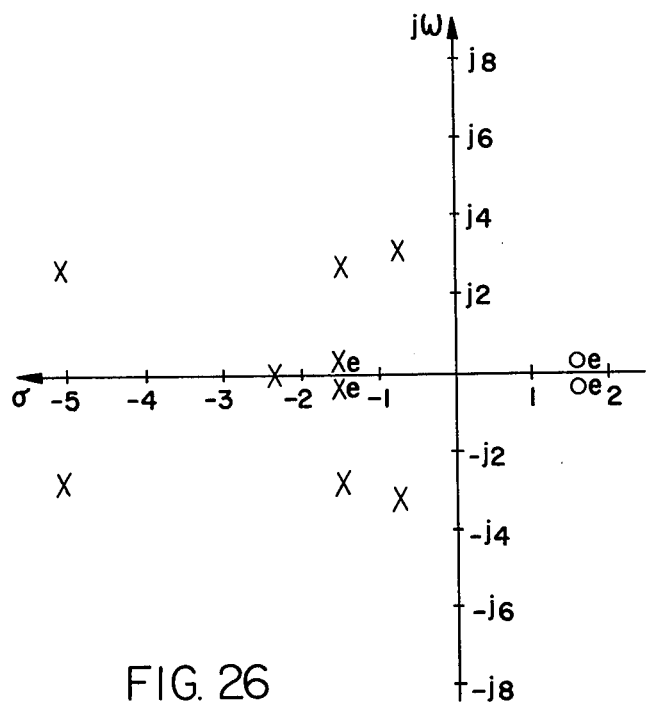
FIGS. 26 and 27 are transmitter and receiver filter and equalizer pole-zero diagrams for a rectangular pulse input to a raised cosine channel with all-pole filters.
Figure 27:
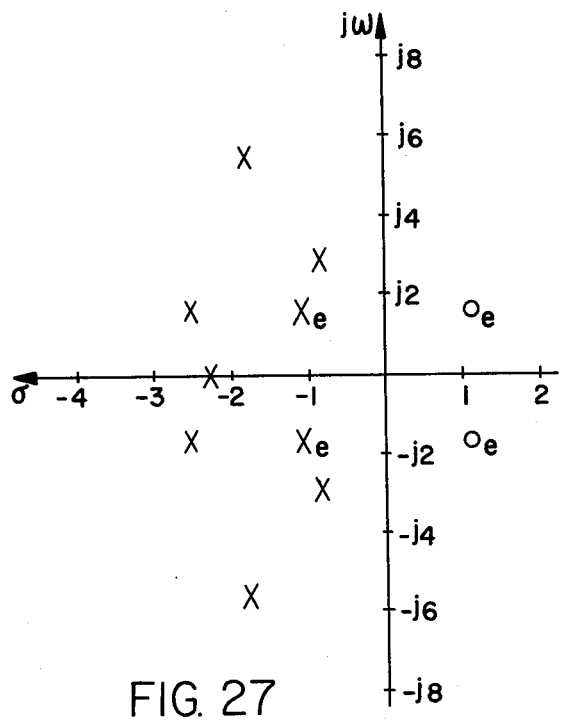
Figure 28:
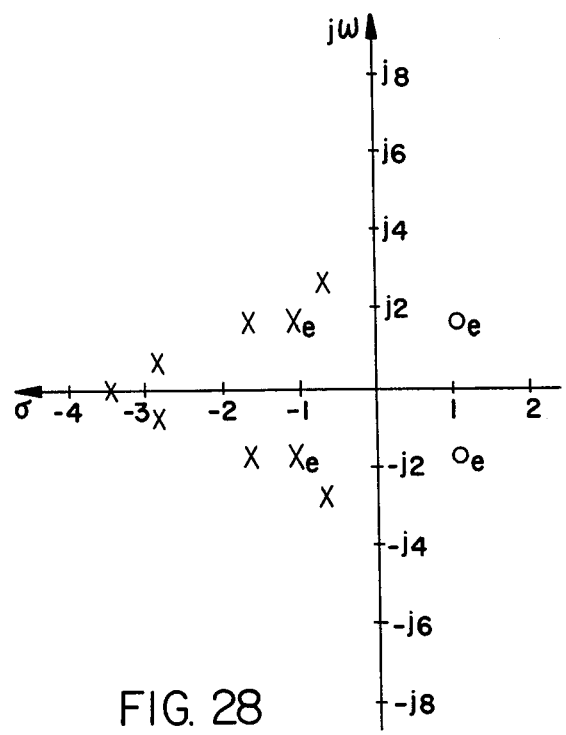
FIGS. 28 and 29 are transmitter and receiver filter equalizer pole-zero diagrams for a rectangular pulse input to a partial response channel with all-pole filters.
Figure 29:
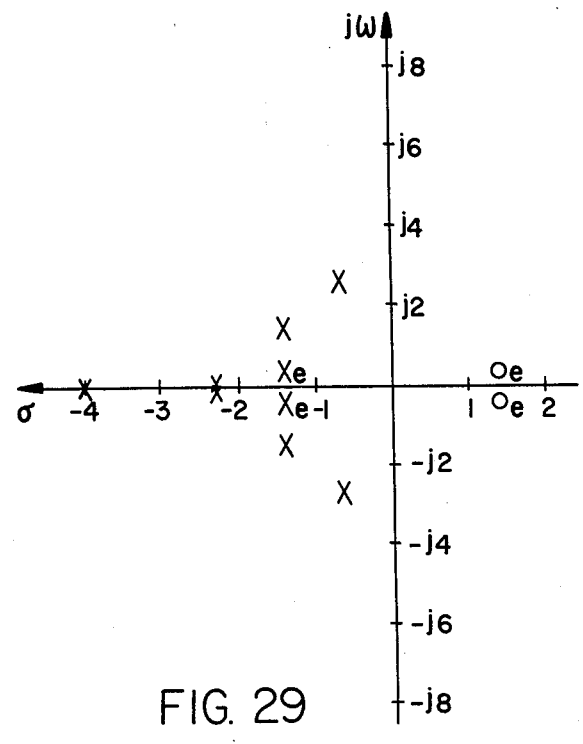
Figure 30:
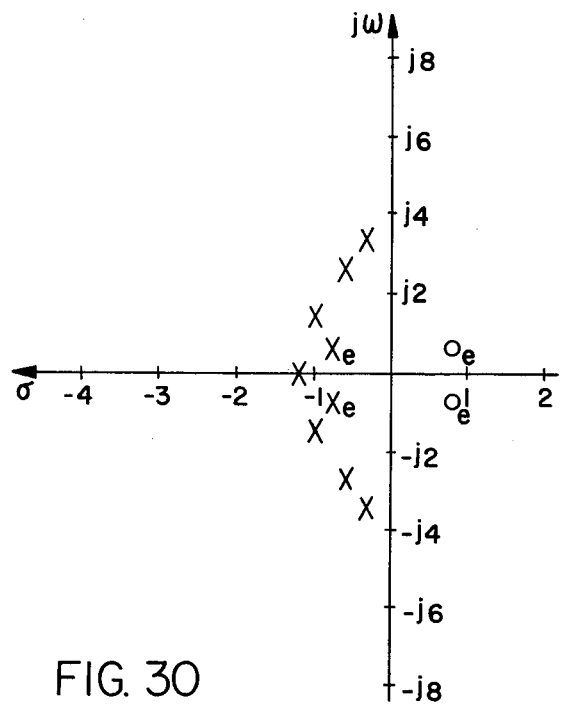
FIGS. 30 and 31 are transmitter and receiver filter and equalizer pole-zero diagrams for a half-wave sinusoidal pulse input to a raised cosine channel with all-pole filters.
Figure 31:
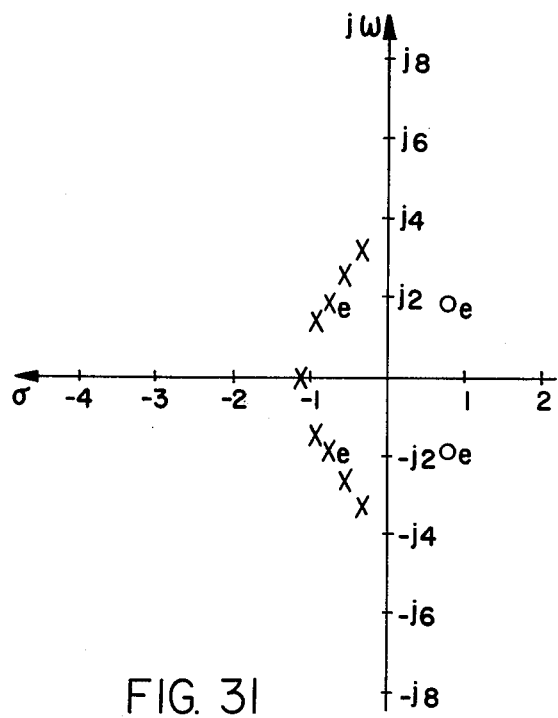
Figure 32:
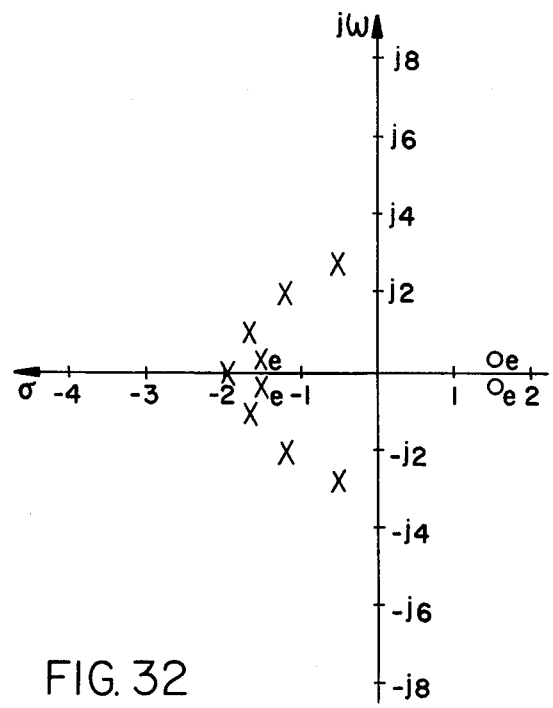
FIGS. 32 and 33 are transmitter and receiver filter and equalizer pole-zero diagrams for a half-wave sinusoidal pulse input to a partial response channel with all-pole filters.
Figure 33:
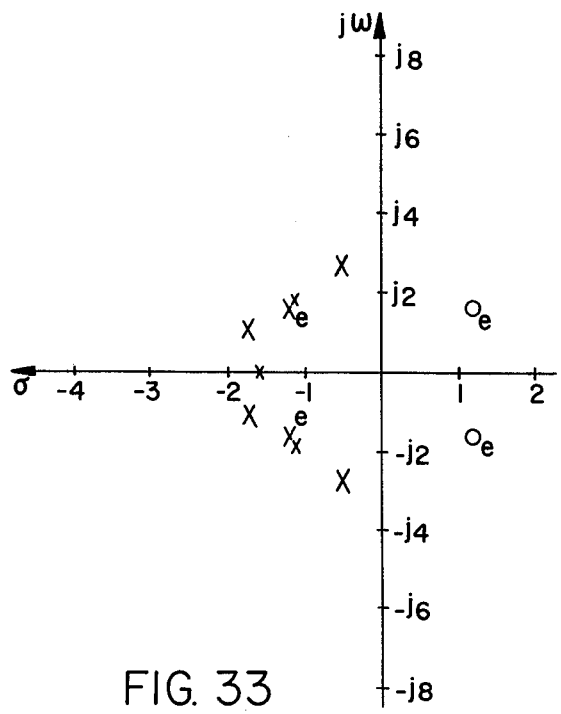

Thus, the pole-zero diagrams of FIGS. 18 and 19 actually specify equal-ripple stopband filters for rectangular pulse inputs and raised cosine channel responses. FIGS. 20 and 21 actually specify such filters for partial response operation. As such, these filters are suitable for PSK systems. The values represented in the pole-zero diagrams were obtained with time domain optimization. The pole locations were optimized simply to minimize the squared error at the sample times. The filters represented are specifically designed for 40 db attenuation in the stopband.

Optimization of the filter structure as disclosed herein has already been completed. The results of such optimization are given in the pole-zero diagrams. The pole-zero diagrams represent optimized prototype filters in specific terms. Thus, it is to be understood that the filter design has been completed and is specified by these pole-zero diagrams. Any particular implementation will require selection of the data rate and center frequency.

In the Examples referred to in Tables A and B, the implementation is for a high density digital transmission system using the pole-zero diagrams of FIGS. 18 and 19. A system with in-phase (I) and quadrature (Q) channels with 16 million bits per second per channel is assumed where as above noted the transmit and receive filters are to operate at a 70 million Hertz IF center frequency.

The first step in implementation was to transform the low-pass prototype pole-zero diagram values to bandpass pole-zero values, i.e., transform column 2, Table A to column 3, Table A. It was found preferable to retain arithmetic symmetry in the realized bandpass transfer function. For this reason, a computerized design aid was used to make the low-pass to bandpass transformations tabulated in column 3 of Table A. The transformation procedure used was the well known procedure described by G. Szentirmai in "The Design of Arithmetically Symmetrical Band-Pass Filters", IEEE Transactions on Circuit Theory, September, 1963. As noted, the results of this transformation are listed in column 3, Table A.

As can be seen from Table A, the results (column 3, Table A) using the Szentirmai criteria are very close to those arrived at by simply multiplying the prototype pole-zero values by $(16)(10^6)$ and then adding $(2\pi)(70)(10^6)$ to the imaginary part. Greater differences exist between results of the latter procedure and results obtained using the Szentirmai criteria for higher ratios of bandwidth to center frequency than are present in the example of table A. The results found in column 3, Table A are preferred because arithmetic symmetry is preserved in the pass band. In such results, the pole-zero diagram is centered about 70 MHz after the values are scaled for 16 million bits per second per channel. The results also include a second set which is the mirror image about the real axis of the first pole-zero set is at $-70$ MHz. In addition, a zero has been added at the origin and a complex pole pair has been added to the transmit and receive filters to help improve symmetry.

The element values from the transformed (column 3, Table A) pole-zero diagrams are listed in Table B. They are determined as generally is the practice by use of a generalized network synthesis computer operation to reduce the burden of the calculations involved. Such practice is known from publications such as "System Analysis by Digital Computer" by F. F. Kuo and J. F. Kaiser, John Wiley, 1967, Chapter 5. The element values of Table B apply to the network structures illustrated in FIGS. 15 and 16. FIG. 15 is the structure used for the transmit and receive filters. FIG. 16 is the structure used for the transmit and receive equalizers.

More specifically, and by way of further example, determination of the equalizer element values may be achieved using well known formulas as taught, for example, by P. R. Geffe, "Simplified Modern Filter Design", John F. Rider, 1963. These formulas express the L and C element values for the network equalizer of FIG. 16 directly in terms of the equalizer pole and zero values as given in Table A. For example, referring to FIG. 14, the element values for the first section of the equalizer 69 are expressed in terms of the real part, a, and then imaginary part, b, of the complex pole location $-a \pm jb$, as follows:

$$C_{14} = C_{15} = 1/2a$$

$$C_{16} = 4a/(b^2 - 3a^2)$$

$$L_7 = 4a/(a^2 + b^2)$$

$L_8 = 1/4a$

Referring now to Table A, the pole location for the first equalizer section is given as $(-26.4 \pm j462)10^{-6}$. Thus, $a = 26.4 \times 10^{-6}$ and $b = 462 \times 10^{-6}$. Substituting these values into the above formulas will yield the corresponding element values listed in Table B. A similar procedure is followed for the second section of the transmit equalizer and for the two sections of the receive equalizer.

Element values for the transmit and receive filters as illustrated in FIG. 15 are obtained by equally well known procedures. In this case, however, the filter complexity precludes direct expression of element values in terms of poles and zeros. Well known procedures for obtaining element values for pole and zero locations are described in Van Valkenberg "Introduction to Modern Network Synthesis", Wiley, 1960. An example computer program for determination of such values is described by G. Szentirmai, "FILSYM-A General Purpose Filter Synthesis Program", Proceedings of IEEE, p. 1443, October, 1977, as having been in use for several years.

The element values are given in Table B are normalized for one ohm termination impedances. Element values for any specific impedance level are obtained by increasing inductor values and decreasing capacitor values in proportion to the increase in impedance level.

To check the above results, performance achievable using the described designs was evaluated. Using a criterion where adjacent channel interference is 10 db below the noise power for a $10^{-6}$ error rate, an adjacent channel spacing of 18.2 MHz was achieved. This corresponds to an information density of 1.76 bps/Hz. While simultaneously satisfying the above frequency domain objectives, the specified filters result in time domain responses that achieve an error rate performance within 0.2 db of the theoretical limit.

EXAMPLE II

The partial response filters of FIGS. 20 and 21 produce partial response pulses for rectangular pulse form inputs using equal-ripple stopband filters with 40 db stopband attenuation. As such, they may be used for implementation of bandpass filter designs for PSK systems with partial response output pulses. Table C lists transformed pole-zero values for filters corresponding to 16 million bits per second and 70 MNz center frequency. The values of Table C were obtained in the same manner as described above for Example I.

Table C

Example Prototype Pole Zero Transformations
Center Frequency = 70 MHz, Data Rate = 16 Mbps
Rectangular Pulse to Partial Response Pulse

| Col. 1 Filter | | Col. 2 Prototype Poles & Zeros $\sigma \pm j\omega$ | Col. 3 Bandpass Poles and Zeros ($\div 10^6$) for Arithmetic Symmetry |
|---|---|---|---|
| Tx. Filter | Poles | $-1.00 \pm j3.03$<br>$-1.28 \pm j2.59$<br>$-2.00$ | $-15.7 \pm j391$<br>$-15.7 \pm j488$<br>$-20.3 \pm j482$<br>$-20.3 \pm j398$<br>$-32.5 \pm j440$<br>$-418 \pm j398$ |
| | Zeros | $0 \pm j4.46$<br>$0 \pm j6.76$ | $0 \pm j369$<br>$0 \pm j510$<br>$0 \pm j544$<br>$0 \pm j336$<br>$0 + j0$ |
| TX. Equalizer | Poles | $-1.63 \pm j1.40$ | $-26.1 \pm j462$<br>$-26.1 \pm j417$ |
| | Zeros | $1.63 \pm j1.40$ | $26.1 \pm j462$ |

Table C-continued

Example Prototype Pole Zero Transformations
Center Frequency = 70 MHz, Data Rate = 16 Mbps
Rectangular Pulse to Partial Response Pulse

| Col. 1 Filter | | Col. 2 Prototype Poles & Zeros $\sigma \pm j\omega$ | Col. 3 Bandpass Poles and Zeros ($\div 10^6$) for Arithmetic Symmetry |
|---|---|---|---|
| Rx. Filter | Poles | $-.711 \pm j2.69$<br>$-1.91 \pm j1.87$<br>$-2.17$ | $26.1 \pm j462$<br>$-11.2 \pm j483$<br>$-11.2 \pm j397$<br>$-30.6 \pm j470$<br>$-30.6 \pm j409$<br>$-35.3 \pm j440$<br>$-418 \pm j398$ |
| | Zeros | $0 \pm j4.22$<br>$0 \pm j6.64$ | $0 \pm j373$<br>$0 \pm j507$<br>$0 \pm j337$<br>$0 \pm j542$<br>$0 + j0$ |
| Rx. Equalizer | Poles | $-1.51 \pm j0.88$ | $-24.2 \pm j454$<br>$-24.2 \pm j426$ |
| | Zeros | $1.51 \pm j0.88$ | $24.2 \pm j454$<br>$24.2 \pm j426$ |

Table D

PSK Bandpass Filter and Equalizer
Element Valves for Raised Cosine Output
Pulses; 16 Mbps channels, 70 MHz Carrier.
$R_{in} = R_{out} = 1$ ohm, C in picofarads, L in nanohenries)
Network element values are given in Table D.

| Element | Tx. Filter | Rx. Filter | Element | Tx. Equalizer | Rx. Equalizer |
|---|---|---|---|---|---|
| L1 | 27.3 | 36.2 | L7 | .487 | .487 |
| C1 | 120 | 91.5 | C14 | 19200 | 20700 |
| C2 | 72.5 | 52.4 | C15 | 493 | 473 |
| C3 | 451 | 452 | L8 | 9.59 | 10.3 |
| L2 | 2.03 | 2.0 | C16 | 493 | 473 |
| C4 | 1897 | 1950 | L9 | .596 | .532 |
| L3 | 11.0 | 11.6 | C17 | 19200 | 20700 |
| C5 | 665 | 621 | C18 | 606 | 539 |
| C6 | 1245 | 1275 | L10 | 9.59 | 10.3 |
| C7 | 1080 | 1005 | C19 | 606 | 539 |
| C8 | 617 | 644 | | | |
| L4 | 79.3 | 75.9 | | | |
| C9 | 4260 | 4480 | | | |
| L5 | 7.05 | 7.62 | | | |
| C10 | 118 | 116 | | | |
| C11 | 1283 | 1050 | | | |
| C12 | 18500 | 118000 | | | |
| C13 | 220 | 160 | | | |
| L6 | .984 | .955 | | | |

The element values correspond to the network structures of FIGS. 15 and 16. Using the filters of FIGS. 15 and 16 and requiring adjacent channel interference power 10 db below the noise power for a $10^{-6}$ error rate, a channel spacing of 15.3 MHz was achieved. The corresponding information density is 2.09 bps/Hz and the achieved error performance was 0.4 db from ideal values.

While other partitionings of the transmitter and receiver filters are possible, the above-described partitioning is used herein as the preferred mode of carrying out the invention. The teachings presented are, however, generally useful for any transmitter and receiver filter partitioning.

While the invention has been illustrated and described with respect to several embodiments thereof, it should be realized that various changes may be made without departing from essential contributions to the art made by the teachings hereof.

What is claimed is:

1. In a band limited high density digital transmission system operating in combination with input and output signal processing means, the combination which comprises:

(a) a transmitter adapted to be connected to said input processing means,
(b) a receiver adapted to be connected to said output processing means,
(c) said transmitter including a modulator having an active pulse forming network and a bandlimiting passive pulse shaping network and said receiver including a detector having a bandlimiting passive pulse shaping network, said networks including means to produce specified output pulse shapes from receiver input pulses, with said receiver input pulse shapes generated by said transmitter passive pulse shaping network operating on specified input pulse shapes generated by said transmitter active pulse shaping network,
(d) the signal channel comprising said transmitter and receiver having a channel function $H_c(j\omega)$ which is the Fourier transform of the desired output pulse in accordance with the relation $$H_c(j\omega) = H_{TX}(j\omega)H_{RX}(j\omega),$$

said bandlimiting passive pulse shaping network of said receiver having the function $H_{RX}$ which is the complex conjugate of the function $H_{TX}$, where $$H_{TX}(j\omega) = |H_c(j\omega)|^{\frac{1}{2}}e^{j\theta(\omega)}$$

and $$H_{RX}(j\omega) = |H_c(j\omega)|^{\frac{1}{2}}e^{-j\theta(\omega)}$$

wherein
$H_{TX}(j\omega)$ is the product of the transmitter active pulse forming network pulse function, $P(j\omega)$, and the transfer function of the passive pulse shaping network, $H_T(j\omega)$, as $$H_{TX}(j\omega) = P(j\omega)H_T(j\omega)$$

the transmitter and receiver pulse shaping networks both being specified by network poles and residues and time domain optimized for achieving specified input-to-output pulse shape transformation and minimizing adjacent channel interference where said transmitter and receiver passive pulse shaping networks are integral parts of the system modulation and detection means.

2. The system of claim 1 wherein said transmitter and receiver includes means for forming each successive receiver output pulse to have maximum value at the pulse sample time and equal to zero at all other sample times where said sample values are obtained from an output pulse shape approximating a raised cosine pulse.

3. The system of claim 2, wherein said transmitter active pulse forming network means is an eight phase PSK modulator means accommodating rectangular in-phase and quadrature phase modulating pulses with normalized amplitude values of ±1 or ±0.707 and where said receiver partition includes an eight phase PSK demodulator means.

4. The system of claim 3, wherein the transmitter bandlimiting passive pulse shaping network means and the receiver bandlimiting pulse shaping network means are all-pole filter means concatenated with all-pass equalizer means.

5. The system of claim 3, wherein the transmitter bandlimiting passive pulse shaping network means and the receiver bandlimiting pulse shaping network means are equal-ripple stopband filter means concatenated with all-pass equalizer means.

6. The system of claim 2, wherein
said transmitter active pulse forming network includes means to modulate in-phase and quadrature phase (I and Q channel) carriers with time coincident rectangular pulses with normalized amplitudes of ±1, ±3, ±5 ... ±k yielding k+1 (k=1,3,5...) output levels on each of said I and Q channels;
where receiver includes independent I and Q channel detection means with phase coherent reference signals at the received signal spectrum center frequency, said reference signals displaced 90° from each other;
said separate I and Q channel detectors being followed by low-pass filters and sampling detectors each operating at a rate of 1/T where T is the channel signalling rate; and
an output signal processing circuit for sample value decoding the outputs of said detectors and combining the same into a single output data stream.

7. The system of claim 6, wherein the transmitter bandlimiting passive pulse shaping network means and the receiver bandlimiting pulse shaping network means are all-pole filter means concatenated with all-pass equalizer means.

8. The system of claim 6, wherein the transmitter bandlimiting passive pulse shaping network means and the receiver bandlimiting pulse shaping network means are equal-ripple stopband filter means concatenated with all-pass equalizer means.

9. The system of claim 2, wherein said transmitter active pulse forming network includes means to modulate in-phase and quadrature phase (I and Q channel) carriers with time offset rectangular pulses with normalized amplitude values of ±1, ±3, ±5, ... ±k yielding k+1 levels on each of said I and Q channels.

10. The system of claim 9, wherein said receiver includes a signal detection means using a single phase coherent reference displaced ±¼T from the received signal spectrum center frequency where T is the channel signalling interval, said detection means being followed by a low-pass filter and a single sampling circuit operating at a rate of 2/T with alternate sample values equal to I and Q channel data values, respectively, and with the algebraic signs on alternate sample values for each individual channel reversed, and an output signal processing circuit for sample value decoding the output of said sampling detectors.

11. The system of claim 10, wherein the transmitter bandlimiting passive pulse shaping network means and the receiver bandlimiting pulse shaping network means are all-pole filter means concatenated with all-pass equalizer means.

12. The system of claim 10, wherein the transmitter bandlimiting passive pulse shaping network means and the receiver bandlimiting pulse shaping network means are equal-ripple stopband filter means concatenated with all-pass equalizer means.

13. The system of claim 9, wherein said receiver includes a signal detector means using separate I and Q channel detectors with phase coherent reference signals at the received signal spectrum center frequency, said reference signals displaced 90° from each other and with said separate I and Q channel detectors followed by low-pass filters and sampling detectors each operating at a rate of 1/T where T is the channel signalling interval, an output signal processing circuit for sample value decoding the outputs of said sampling detectors and combining the same into a single output data stream.

14. The system of claim 13, wherein the transmitter bandlimiting passive pulse shaping network means and the receiver bandlimiting pulse shaping network means are all-pole filter means concatenated with all-pass equalizer means.

15. The system of claim 13, wherein the transmitter bandlimiting passive pulse shaping network means and the receiver bandlimiting pulse shaping network means are equal-ripple stopband filter means concatenated with all-pass equalizer means.

16. The system of claim 2, wherein said active pulse forming network includes means to modulate in-phase and quadrature phase (I and Q channel) carriers with time offset half-wave sinusoidal pulses with normalized peak amplitude values of $\pm 1$, $\pm 3$, $\pm 5$, ... $\pm k$, in a systems approach yielding k+1 peak levels on each of said I and Q channels.

17. The system of claim 16, wherein said receiver includes a signal detection means using a single phase coherent reference displaced $\pm\frac{1}{4}T$ from the received signal spectrum center freqeuncy where T is the channel signalling interval, said detection means being followed by a low-pass filter and a single sampling circuit operating at a rate of 2/T with alternate sample value equal to I and Q channel data values, respectively, and with the algebraic signs on alternate sample values for each individual channel reversed, and an output signal processing circuit for sample value decoding the output of said sampling detectors.

18. The system of claim 17, wherein the transmitter bandlimiting passive pulse shaping network means and the receiver bandlimiting pulse shaping network means are all-pole filter means concatenated with all-pass equalizer means.

19. The system of claim 17, wherein the transmitter bandlimiting passive pulse shaping network means and the receiver bandlimiting pulse shaping network means are equal-ripple stopband filter means concatenated with all-pass equalizer means.

20. The system of claim 16, wherein said receiver includes a signal detector means using separate I and Q channel detectors with phase coherent reference signals at the received signal spectrum center frequency, said reference signals displaced 90° from each other and with said separate I and Q channel detectors followed by low-pass filters and sampling detectors each operating at a rate of 1/T where T is the channel signalling interval, and an output signal processing circuit for sample value decoding the outputs of said sampling detectors and combining the same into a single output data stream.

21. The system of claim 20, wherein the transmitter bandlimiting passive pulse shaping network means and the receiver bandlimiting pulse shaping network means are all-pole filter means concatenated with all-pass equalizer means.

22. The system of claim 20, wherein the transmitter bandlimiting passive pulse shaping network means and the receiver bandlimiting pulse shaping network means are equal-ripple stopband filter means concatenated with all-pass equalizer means.

23. The system of claim 1 wherein said transmitter and receiver includes means for forming each successive receiver output pulse to have equal values at two successive pulse sample times and equal to zero at all other sample times, thereby yielding output sample values equal to the sum of two successive pulse values, where said sample values are obtained from an output pulse shape approximating a partial response pulse.

24. The system of claim 23, wherein
said transmitter active pulse forming network includes means to modulate in-phase and quadrature phase (I and Q channel) carriers with time coincident rectangular pulses with normalized amplitudes of $\pm 1$, $\pm 3$, $\pm 5$, ... $\pm k$ yielding 2k+1 output levels on each of said I and Q channels;
with said receiver including independent I and Q channel detection means with phase coherent reference signals at the received signal spectrum center frequency, said reference signals displaced 90° from each other;
said separate I and Q channel detectors being followed by low-pass filters and sampling detectors each operating at a rate of 1/T where T is the channel signalling rate; and
an output signal processing circuit for sample value decoding the outputs of said detectors and combining the same into a single output data stream.

25. The system of claim 24, wherein the transmitter bandlimiting passive pulse shaping network means and the receiver bandlimiting pulse shaping network means are all-pole filter means concatenated with all-pass equalizer means.

26. The system of claim 24, wherein the transmitter bandlimiting passive pulse shaping network means and the receiver bandlimiting pulse shaping network means are equal-ripple stopband filter means concatenated with all-pass equalizer means.

27. The system of claim 23, wherein said transmitter active pulse forming network includes means to modulate in-phase and quadrature phase (I and Q channel) carriers with time offset rectangular pulses with normalized sample values of $\pm 1$, $\pm 3$, $\pm 5$, ... $\pm k$ yielding 2k+1 levels on each of said I and Q channels.

28. The system of claim 27, wherein said receiver includes a signal detection means using a single phase coherent reference displaced $\pm\frac{1}{4}T$ from the received signal spectrum center frequency where T is the channel signalling interval, said detection means being followed by a low-pass filter and a single sampling circuit operating at a rate of 2/T with alternate sample values equal to I and Q channel data values, respectively, and with the algebraic signs on alternate sample values for each individual channel reversed, and an output signal processing circuit for sample value decoding the output of said sampling detectors.

29. The system of claim 28, wherein the transmitter bandlimiting passive pulse shaping network means and the receiver bandlimiting pulse shaping network means are all-pole filter means concatenated with all-pass equalizer means.

30. The system of claim 28, wherein the transmitter bandlimiting passive pulse shaping network means and the receiver bandlimiting pulse shaping network means are equal-ripple stopband filter means concatenated with all-pass equalizer means.

31. The system of claim 27, wherein said receiver includes a signal detector means using separate I and Q channel detectors with phase coherent reference signals at the received signal spectrum center frequency, said reference signals displaced 90° from each other and with said separate I and Q channel detectors followed by low-pass filters and sampling detectors each operating at a rate of 1/T and T is the channel signalling interval, and an output signal processing circuit for sample value decoding the outputs of said sampling detectors and combining the same into a single output data stream.

32. The system of claim 31, wherein the transmitter bandlimiting passive pulse shaping network means and the receiver bandlimiting pulse shaping network means are all-pole filter means concatenated with all-pass equalizer means.

33. The system of claim 31, wherein the transmitter bandlimiting passive pulse shaping network means and the receiver bandlimiting pulse shaping network means are equal-ripple stopband filter means concatenated with all-pass equalizer means.

34. The system of claim 23, wherein said active pulse forming network includes means to modulate in-phase and quadrature phase (I and Q channel) carriers with time offset half-wave sinusoidal pulses with normalized peak amplitude values of $\pm 1, \pm 3, \pm 5, \ldots \pm k$, yielding $2k+1$ peak output levels on each of said I and Q channels.

35. The system of claim 34, wherein said receiver includes a signal detection means using a single phase coherent reference displaced $\pm \frac{1}{4}T$ from the received signal spectrum center frequency where T is the channel signalling interval, said detection means being followed by a low-pass filter and a single sampling circuit operating at a rate of 2/T with alternate sample values equal to I and Q channel data values, respectively, and with the algebraic signs on alternate sample values for each individual channel reversed, and an output signal processing circuit for sample value decoding the outputs of said sampling detectors.

36. The system of claim 35, wherein the transmitter bandlimiting passive pulse shaping network means and the receiver bandlimiting pulse shaping network means are all-pole filter means concatenated with all-pass equalizer means.

37. The system of claim 35, wherein the transmitter bandlimiting passive pulse shaping network means and the receiver bandlimiting pulse shaping network means are equal-ripple stopband filter means concatenated with all-pass equalizer means.

38. The system of claim 34, wherein said receiver includes a signal detector means using separate I and Q channel detectors with phase coherent reference signals at the received signal spectrum center frequency, said reference signals displaced 90° from each other and with said separate I and Q channel detectors followed by low-pass filters and sampling detectors each operating at a rate of 1/T where T is the channel signalling interval, and an output signal processing circuit for sample value decoding the outputs of said sampling detectors and combining the same into a single output data stream.

39. The system of claim 38, wherein the transmitter bandlimiting passive pulse shaping network means and the receiver bandlimiting pulse shaping network means are all-pole filter means concatenated with all-pass equalizer means.

40. The system of claim 38, wherein the transmitter bandlimiting passive pulse shaping network means and the receiver bandlimiting pulse shaping networks means are equal-ripple stopband filter means concatenated with all-pass equalizer means.

41. In a transmitter system for use in a high density bandlimited digital transmission system for use with a receiver having a pulse shaping network;
 (a) an active pulse shaping network for generating modulated output pulses in response to data input from a precoder and frequency input from a stable frequency source;
 (b) a passive pulse shaping network connected to accept input from the said active pulse shaping network and related to said receiver pulse shaping network to assure specified receiver output pulses with controlled intersymbol interference and predetermined suppression of adjacent channel interference;
 (c) a transmitter output system accepting input from said passive pulse shaping network and said stable frequency source for producing an output signal for transmission to said receiver where the composite channel function $H_c(j\omega)$ is the Fourier transform of the desired output pulse and is given by $$H_c(j\omega) = H_{TX}(j\omega) H_{RX}(j\omega)$$

matching the receiver filter performance with the receiver filter function being the complex conjugate of the transmitter function $$H_{TX}(j\omega) = |H_c(j\omega)|^{\frac{1}{2}} e^{j\theta(\omega)}$$

$$H_{RX}(j\omega) = |H_c(j\omega)|^{\frac{1}{2}} e^{-j\theta(\omega)}$$

with $H_{TX}(j\omega)$ being realized as the product of the transmitter active pulse forming network pulse function, $P(j\omega)$, and the transfer function of the passive pulse shaping network, $H_T(j\omega)$, as $$H_{TX}(j\omega) = P(j\omega) H_T(j\omega);$$

and
 where said transmitter passive pulse forming network is specified by the network poles and residues enabling time domain optimization of the end-to-end channel response in achieving the specified input-to-output pulse shape transformation while meeting specified adjacent channel interference attenuation where said transmitter passive pulse shaping filter means thus is an integral part of the system modulation.

42. The transmitter system of claim 41, wherein said transmitter active pulse forming network means is an eight phase PSK modulator means with rectangular in-phase and quadrature phase modulating pulses with normalized amplitude values of $\pm 1.0$ or $\pm 0.707$ and with said receiver partition including an eight phase PSK demodulator means.

43. The transmitter system of claim 41, wherein said transmitter active pulse forming network modulates in-phase and quadrature phase (I and Q channel) carriers with time coincident rectangular pulses with normalized amplitudes of $\pm 1, \pm 3, \pm 5 \ldots \pm k$ yielding $k+1$ ($k=1,3,5 \ldots$) output levels on each of said I and Q channels.

44. The transmitter system of claim 41, wherein said transmitter active pulse forming network modulates in-phase and quadrature phase (I and Q channel) carriers with time offset rectangular pulses with normalized amplitude values of $\pm 1, \pm 3, \pm 5 \ldots \pm k$ yielding $k+1$ levels on each of said I and Q channels.

45. The transmitter system of claim 41, wherein said active pulse forming network modulates in-phase and quadrature phase (I and Q channel) carriers with time offset half-wave sinusoidal pulses with normalized peak amplitude values of $\pm 1, \pm 3, \pm 5, \ldots \pm k$, in a systems approach yielding $k+1$ peak levels on each of said I and Q channels.

46. In a receiver system for use in high density bandlimited digital transmission from a transmitter having a passive pulse shaping network;
  a receiver input system for accepting a received RF input signal and a frequency reference signal from a timing and frequency recovery circuit and for producing an amplifier output signal for further receiver processing;
  a receiver pulse shaping network for accepting as input the output from said receiver input system and operating in combination with said transmitter passive pulse shaping network to produce output pulses with controlled intersymbol interference and predetermined suppression of adjacent channel interference, said receiver pulse shaping network also including means for providing inputs to said timing and frequency recovery circuit;
  a detection and decoding system for accepting as its input the output from the receive pulse shaping network and including means to sample said output in synchronism with a clock signal supplied from the timing and frequency recovery means producing sample values which are decoded into output data values; with the composite channel function $H_c(j\omega)$ being the Fourier transform of the desired output pulse and being given by $$H_c(j\omega) = H_{TX}(j\omega) H_{RX}(j\omega)$$

with optimal channel partitioning yielding matched filter receiver performance with the receiver function being the complex conjugate of the transmitter function yielding $$H_{TX}(j\omega) = |H_c(j\omega)|^{\frac{1}{2}} e^{j\theta(\omega)}$$

$$H_{RX}(j\omega) = |H_c(j\omega)|^{\frac{1}{2}} e^{-j\theta(\omega)}$$

with $H_{TX}(j\omega)$ being realized as the product of the transmitter active pulse forming network pulse function, $P(j\omega)$, and the transfer function of the passive pulse shaping network, $H_T(j\omega)$, as $$H_{TX}(j\omega) = P(j\omega) H_T(j\omega);$$

and transmitter and receiver passive pulse forming network means being specified by the network poles and residues enabling time domain optimization of the end-to-end channel response in achieving the specified input-to-output pulse shape transformation while meeting specified adjacent channel interference attenuation; said transmitter and receiver passive pulse shaping filter means thus being an integral part of the system modulation and detection means.

47. The receiver system of claim 46, wherein each successive receiver output pulse has maximum value at the pulse sample time and is equal to zero at all other sample times with said sample values being realized with an output pulse shape approximating a raised cosine pulse.

48. The receiver system of claim 47, wherein said receiver demodulates independent received I and Q data channel with time-offset modulating pulses using a single phase coherent reference displaced $\pm \frac{1}{4}T$ from the received signal spectrum center frequency where T is the channel signalling interval, said detection means being followed by a low-pass filter and a single sampling circuit operating at a rate of 2/T with alternate sample values equal to I and Q channel data values, respectively, and with the algebraic signs on alternate sample values for each individual channel reversed, and with the output of said sampling detectors being fed to output signal processing circuitry means for sample value decoding.

49. The receiver system of claim 47, wherein said receiver includes a signal detector means using separate I and Q channel detectors with phase coherent reference signals at the received signal spectrum center frequency, said reference signals displaced 90° from each other and with said separate I and Q channel detectors followed by low-pass filters and sampling detectors each operating at a rate of 1/T where T is the channel signalling interval, the outputs of said sampling detectors being fed to output signal processing circuitry means for sample value decoding and combination into a single output data stream.

50. The receiver system of claim 46, wherein each successive receiver output pulse has equal values at two successive pulse sample times and is equal to zero at all other sample times, thereby yielding output sample values equal to the sum of two successive pulse values, said sample values being realized with an output pulse shape approximating a partial response pulse.

51. The receiver system of claim 50, wherein said receiver includes means to demodulate independent received I and Q data channel with time-offset modulating pulses using a single phase coherent reference displaced $\pm \frac{1}{4}T$ from the received signal spectrum center frequency where T is the channel signalling interval, said detection means being followed by a low-pass filter and a single sampling circuit operating at a rate of 2/T with alternate sample values equal to I and Q channel data values, respectively, and with the algebraic signs of alternate sample values for each individual channel reversed, and means to feed the output of said sampling detectors to an output signal processing circuit for sample value decoding.

52. The receiver system of claim 50, wherein said receiver includes a signal detector means using separate I and Q channel detectors with phase coherent reference signals at the received signal spectrum center frequency, said reference signals displaced 90° from each other and with said separate I and Q channel detectors followed by low-pass filters and sampling detectors each operating at a rate of 1/T where T is the channel signalling interval, the outputs of said sampling detectors being fed to output signal processing circuitry means for sample value decoding and combination into a single output data stream.

53. In a band limited high density digital transmission system operating in combination with input and output signal processing means, the combination which comprises:
  (a) a transmitter adapted to be connected to said input processing means,
  (b) a receiver adapted to be connected to said output processing means, (c) said transmitter including a modulator having an active pulse forming network and a bandlimiting passive pulse shaping network and said receiver including a detector having a bandlimiting passive pulse shaping network, said networks including means to produce specified output pulse shapes from receiver input pulses, with said receiver input pulse shapes generated by said transmitter passive pulse shaping network operating on specified input pulse shapes generated by said transmitter active pulse shaping network, (d) the signal channel comprising said transmitter and receiver having a channel function $H_c(j\omega)$ which is the Fourier transform of the desired output pulse in accordance with the relation $$H_c(j\omega) = H_{TX}(j\omega)H_{RX}(j\omega),$$

wherein $H_{TX}(j\omega)$ is the product of the transmitter active pulse forming network pulse function, $P(j\omega)$, and the transfer function of the passive pulse shaping network, $H_T(j\omega)$, as $$H_{TX}(j\omega) = P(j\omega)H_T(j\omega)$$

the transmitter and receiver pulse shaping networks both being specified by network poles and residues and time domain optimized for achieving specified input-to-output pulse shape transformation and minimizing adjacent channel interference where said transmitter and receiver passive pulse shaping networks are integral parts of the system modulation and detection means.

* * * * *

UNITED STATES PATENT AND TRADEMARK OFFICE
CERTIFICATE OF CORRECTION

PATENT NO. : 4,135,057

DATED : January 16, 1979

INVENTOR(S) : Jon W. Bayless, Sr.; Robert D. Pedersen; John C. Bellamy, II.

It is certified that error appears in the above-identified patent and that said Letters Patent are hereby corrected as shown below:

Column 3, line 26, omit "and".

Column 6, line 17, after "T", add --)--.

Column 6, line 19, change "$h_c$" to --$h_c$--.

Column 6, line 35, change "term" to --terms--.

Column 7, line 59, change "2(k T/2)," to --I(k T/2),--.

Column 10, line 30, change "$z_1^2$" to --$z_i^2$--.

Column 11, line 29, change "transormation" to --transformation--.

Column 14, line 12, change "and" to --the--.

Column 14, line 18, after "stopband", add --"--.

Column 14, line 45, in Table A, heading of Column 2, change "o t jw" to --$\sigma$ + jw--.

Column 14, line 53, in Column 3 of Table A, change "0 $\pm$ j0" to --0 + j0--.

Column 14, line 65, in Column 3 of Table A, change "0 $\pm$ j0" to --0 + j0--.

Column 15, line 8, in Column 2 of Table A, change "0 t jw" to -- 0 + jw--.

Column 15, line 29, change "Pules" to --Pulses--.

Column 16, line 41, change "are" to --were--.

Column 17, line 48, change "MNz" to --MHz--.

Column 17, Table C, in heading of Column 2, change "o t jw" to --$\sigma$ + jw--.

UNITED STATES PATENT AND TRADEMARK OFFICE
CERTIFICATE OF CORRECTION

PATENT NO. : 4,135,057
DATED : January 16, 1979
INVENTOR(S) : Jon W. Bayless, Sr.; Robert D. Pedersen; John C. Bellamy, II.

It is certified that error appears in the above-identified patent and that said Letters Patent are hereby corrected as shown below:

Column 18, Table C, in heading of Column 2, change
   "o t jw" to --$\sigma$ + jw--.

Column 18, line 26, in heading of Table D, before "R in"
   add --(--.

Column 23, line 2, change "and" to --where--.

UNITED STATES PATENT AND TRADEMARK OFFICE
CERTIFICATE OF CORRECTION

PATENT NO. : 4,135,057

DATED : January 16, 1979

INVENTOR(S) : Jon W. Bayless, Sr.; Robert D. Pedersen; John C. Bellamy, II.

It is certified that error appears in the above-identified patent and that said Letters Patent are hereby corrected as shown below:

Column 14, Table A, printed:        Should be:

Table A (printed)

Example Prototype Pole Zero Tranformations
Center Frequency = 70 MHz, Data Rate = 16 Mbps
Rectangular Pulse to Raised Cosine Pulse

| Col. 1 Filter | | Col. 2 Prototype Poles & Zeros $\sigma \pm j\omega$ | Col. 3 Band pass Poles and Zeros ($\div 10^6$) for Arithmetic Symmetry |
|---|---|---|---|
| Tx. Filter | Poles | $-0.51 \pm j3.32$<br>$-1.22 \pm j2.68$<br>$-2.72$ | $-7.90 \pm j493$<br>$-7.90 \pm j387$<br>$-19.3 \pm j483$<br>$-19.3 \pm j397$<br>$-44.4 \pm j440$<br>$-417 \pm j398$ |
| | Zeros | $0 \pm j4.90$<br>$0 \pm j7.35$ | $0 \pm j517$<br>$0 \pm j363$<br>$0 \pm j552$<br>$0 \pm j327$<br>$0 \pm j0$ |
| Tx. Equalizer | Poles | $-1.65 \pm j1.39$ | $-26.4 \pm j462$<br>$-26.4 \pm j418$ |
| | Zero | $-1.65 \pm j1.39$ | $26.4 \pm j462$<br>$26.4 \pm j418$ |
| Rx. Filter | Poles | $-0.35 \pm j3.27$<br>$-1.09 \pm j2.66$<br>$-1.69$ | $-5.53 \pm j492$<br>$-5.53 \pm j387$<br>$-17.2 \pm j483$<br>$-17.2 \pm j397$<br>$-27.4 \pm j440$ |
| | Zeros | $0 \pm j4.49$<br>$0 \pm j6.55$ | $0 \pm j511$<br>$0 \pm j369$<br>$0 \pm j541$<br>$0 \pm j339$<br>$0 \pm j0$ |
| Rx. Equalizer | Poles | $-1.66 \pm j1.01$ | $-26.6 \pm j456$<br>$-26.6 \pm j424$ |
| | | $1.66 \pm j1.02$ | $26.6 \pm j456$ |

Table A (Should be)

Example Prototype Pole Zero Tranformations
Center Frequency = 70 MHz, Data Rate = 16 Mbps
Rectangular Pulse to Raised Cosine Pulse

| Col. 1 Filter | | Col. 2 Prototype Poles & Zeros $\sigma \pm j\omega$ | Col. 3 Band pass Poles and Zeros ($\div 10^6$) for Arithmetic Symmetry |
|---|---|---|---|
| Tx. Filter | Poles | $-0.51 \pm j3.32$<br>$-1.22 \pm j2.68$<br>$-2.72$ | $-7.90 \pm j493$<br>$-7.90 \pm j387$<br>$-19.3 \pm j483$<br>$-19.3 \pm j397$<br>$-44.4 \pm j440$<br>$-417 \pm j398$ |
| | Zeros | $0 \pm j4.90$<br>$0 \pm j7.35$ | $0 \pm j517$<br>$0 \pm j363$<br>$0 \pm j552$<br>$0 \pm j327$<br>$0 \pm j0$ |
| Tx. Equalizer | Poles | $-1.65 \pm j1.39$ | $-26.4 \pm j462$<br>$-26.4 \pm j418$ |
| | Zero | $-1.65 \pm j1.39$ | $26.4 \pm j462$<br>$26.4 \pm j418$ |
| Rx. Filter | Poles | $-0.35 \pm j3.27$<br>$-1.09 \pm j2.66$<br>$-1.69$ | $-5.53 \pm j492$<br>$-5.53 \pm j387$<br>$-17.2 \pm j483$<br>$-17.2 \pm j397$<br>$-27.4 \pm j440$ |
| | Zeros | $0 \pm j4.49$<br>$0 \pm j6.55$ | $0 \pm j511$<br>$0 \pm j369$<br>$0 \pm j541$<br>$0 \pm j339$<br>$0 \pm j0$ |
| Rx. Equalizer | Poles | $-1.66 \pm j1.01$ | $-26.6 \pm j456$<br>$-26.6 \pm j424$ |
| | | $1.66 \pm j1.02$ | $26.6 \pm j456$ |

UNITED STATES PATENT AND TRADEMARK OFFICE
CERTIFICATE OF CORRECTION

PATENT NO. : 4,135,057

DATED : January 16, 1979

Page 4 of 5

INVENTOR(S) : Jon W. Bayless, Sr.; Robert D. Pedersen; John C. Bellamy, II.

It is certified that error appears in the above-identified patent and that said Letters Patent are hereby corrected as shown below:

Column 17, Table C printed:    Should be:

Table C
Example Prototype Pole Zero Transformations
Center Frequency = 70 MHz, Data Rate = 16 Mbps
Rectangular Pulse to Partial Response Pulse

| Col. 1 Filter | | Col. 2 Prototype Poles & Zeros $\sigma \pm j\omega$ | Col. 3 Bandpass Poles and Zeros ($\div 10^6$) for Arithmetic Symmetry |
|---|---|---|---|
| Tx. Filter | Poles | $-1.00 \pm j3.03$ $-1.28 \pm j2.59$ $-2.00$ | $-15.7 \pm j391$ $-15.7 \pm j488$ $-20.3 \pm j482$ $-20.3 \pm j398$ $-32.5 \pm j440$ $-418 \pm j398$ |
|  | Zeros | $0 \pm j4.46$ $0 \pm j6.76$ | $0 \pm j369$ $0 \pm j510$ $0 \pm j544$ $0 \pm j336$ $0 + j0$ |
| TX. Equalizer | Poles Zeros | $-1.63 \pm j1.40$ $1.63 \pm j1.40$ | $-26.1 \pm j462$ $-26.1 \pm j417$ $26.1 \pm j462$ |

Table C
Example Prototype Pole Zero Transformations
Center Frequency = 70 MHz, Data Rate = 16 Mbps
Rectangular Pulse to Partial Response Pulse

| Col. 1 Filter | | Col. 2 Prototype Poles & Zeros $\sigma \pm j\omega$ | Col. 3 Bandpass Poles and Zeros ($\div 10^6$) for Arithmetic Symmetry |
|---|---|---|---|
| Tx. Filter | Poles | $-1.00 \pm j3.03$ $-1.28 \pm j2.59$ $-2.00$ | $-15.7 \pm j391$ $-15.7 \pm j488$ $-20.3 \pm j482$ $-20.3 \pm j398$ $-32.5 \pm j440$ $-418 \pm j398$ |
|  | Zeros | $0 \pm j4.46$ $0 \pm j6.76$ | $0 \pm j369$ $0 \pm j510$ $0 \pm j544$ $0 \pm j336$ $0 + j0$ |
| TX. Equalizer | Poles Zeros | $-1.63 \pm j1.40$ $1.63 \pm j1.40$ | $-26.1 \pm j462$ $-26.1 \pm j417$ $26.1 \pm j462$ |

UNITED STATES PATENT AND TRADEMARK OFFICE
CERTIFICATE OF CORRECTION

PATENT NO. : 4,135,057

DATED : January 16, 1979

Page 5 of 5

INVENTOR(S) : Jon W. Bayless, Sr.; Robert D. Pedersen; John C. Bellamy, II.

It is certified that error appears in the above—identified patent and that said Letters Patent are hereby corrected as shown below:

Column 18, Table C-continued, printed:     Should be:

Printed:

Table C-continued
Example Prototype Pole Zero Transformations
Center Frequency = 70 MHz, Data Rate = 16 Mbps
Rectangular Pulse to Partial Response Pulse

| Col. 1 Filter | | Col. 2 Prototype Poles & Zeros $\sigma \pm j\omega$ | Col. 3 Bandpass Poles and Zeros ($\div 10^6$) for Arithmetic Symmetry |
|---|---|---|---|
| Rx. Filter | Poles | $-.711 \pm j2.69$ $-1.91 \pm j1.87$ $-2.17$ | $26.1 \pm j462$ $-11.2 \pm j483$ $-11.2 \pm j397$ $-30.6 \pm j470$ $-30.6 \pm j409$ $-35.3 \pm j440$ $-418 \pm j398$ |
| | Zeros | $0 \pm j4.22$ $0 \pm j6.64$ | $0 \pm j373$ $0 \pm j507$ $0 \pm j337$ $0 \pm j542$ |
| Rx. Equalizer | Poles | $-1.51 \pm j0.88$ | $-24.2 \pm j454$ $-24.2 \pm j426$ |
| | Zeros | $1.51 \pm j0.88$ | $24.2 \pm j454$ $24.2 \pm j426$ |

Should be:

Table C-continued
Example Prototype Pole Zero Transformations
Center Frequency = 70 MHz, Data Rate = 16 Mbps
Rectangular Pulse to Partial Response Pulse

| Col. 1 Filter | | Col. 2 Prototype Poles & Zeros $\sigma \pm j\omega$ | Col. 3 Bandpass Poles and Zeros ($\div 10^6$) for Arithmetic Symmetry |
|---|---|---|---|
| Rx. Filter | Poles | $-.711 \pm j2.69$ $-1.91 \pm j1.87$ $-2.17$ | $26.1 \pm j462$ $-11.2 \pm j483$ $-11.2 \pm j397$ $-30.6 \pm j470$ $-30.6 \pm j409$ $-35.3 \pm j440$ $-418 \pm j398$ |
| | Zeros | $0 \pm j4.22$ $0 \pm j6.64$ | $0 \pm j373$ $0 \pm j507$ $0 \pm j337$ $0 \pm j542$ $0 \pm j0$ |
| Rx. Equalizer | Poles | $-1.51 \pm j0.88$ | $-24.2 \pm j454$ $-24.2 \pm j426$ |
| | Zeros | $1.51 \pm j0.88$ | $24.2 \pm j454$ $24.2 \pm j426$ |

Signed and Sealed this

Fifteenth Day of May 1979

[SEAL]

Attest:

RUTH C. MASON
*Attesting Officer*

DONALD W. BANNER
*Commissioner of Patents and Trademarks*